(12) United States Patent
Webster et al.

(10) Patent No.: US 11,090,136 B2
(45) Date of Patent: Aug. 17, 2021

(54) DENTAL MATRIX DEVICES

(71) Applicant: ULTRADENT PRODUCTS, INC., South Jordan, UT (US)

(72) Inventors: Thomas John Webster, Riverton, UT (US); Bruce S McLean, Sandy, UT (US); Wade Robert Michael Smith, Pleasant Grove, UT (US)

(73) Assignee: Ultradent Products, Inc., South Jordan, UT (US)

( * ) Notice: Subject to any disclaimer, the term of this patent is extended or adjusted under 35 U.S.C. 154(b) by 264 days.

(21) Appl. No.: 16/111,023

(22) Filed: Aug. 23, 2018

(65) Prior Publication Data

US 2019/0060032 A1 Feb. 28, 2019

Related U.S. Application Data

(60) Provisional application No. 62/550,549, filed on Aug. 25, 2017.

(51) Int. Cl.
*A61C 5/85* (2017.01)

(52) U.S. Cl.
CPC ...................... *A61C 5/85* (2017.02)

(58) Field of Classification Search
CPC .................................. A61C 5/80–88
USPC .............................. 433/38–41, 148–149, 155
See application file for complete search history.

(56) References Cited

U.S. PATENT DOCUMENTS

| | | | |
|---|---|---|---|
| 348,628 A | | 9/1886 | Hewett |
| 1,348,257 A | * | 8/1920 | Wagner .................... A61C 5/85 433/155 |
| 2,286,021 A | | 6/1942 | Stanford |
| 2,439,703 A | * | 4/1948 | Tofflemire ............... A61C 5/85 433/155 |
| 2,786,273 A | * | 3/1957 | Reiter ...................... A61C 5/85 433/155 |
| 2,964,847 A | * | 12/1960 | Tofflemire ............... A61C 5/85 433/155 |

(Continued)

FOREIGN PATENT DOCUMENTS

| | | | |
|---|---|---|---|
| EP | 0227590 A1 * | 7/1987 | ............... A61C 5/85 |
| EP | 0227590 A1 | 7/1987 | |

OTHER PUBLICATIONS

International Preliminary Report on Patentability dated Mar. 5, 2020, in related PCT Application No. PCT/US2018/048022.

(Continued)

*Primary Examiner* — Heidi M Eide
(74) *Attorney, Agent, or Firm* — Maschoff Brennan

(57) ABSTRACT

A dental matrix device may include a body and a clamp retainer. The body may include a clamp cavity, an aperture, and a ramp immediately adjacent to the aperture. The clamp retainer may be at least partially positioned in the clamp cavity. The clamp retainer may be at least partially positioned in the clamp cavity and may include a clamp portion at a first end that may include a levered portion that is rotatably connected to a base. Translation of the clamp retainer in a first direction may draw the clamp retainer into the clamp cavity such that a lower surface of the levered portion rotates towards an upper surface of the base. Translation of the clamp retainer in a second direction may push the levered portion up the ramp to separate the lower surface of the levered portion from the upper surface of the base.

21 Claims, 23 Drawing Sheets

(56) References Cited

U.S. PATENT DOCUMENTS

| | | | | |
|---|---|---|---|---|
| 3,020,638 A | * | 2/1962 | Tofflemire | A61C 5/85 433/155 |
| 3,105,301 A | * | 10/1963 | Tofflemire | A61C 5/85 433/155 |
| 3,462,841 A | | 8/1969 | Ainsworth | |
| 3,517,444 A | * | 6/1970 | Tofflemire | A61C 5/85 433/158 |
| 3,613,245 A | * | 10/1971 | Knight | A61C 5/85 433/155 |
| 5,055,045 A | * | 10/1991 | Dickie | A61C 5/85 433/155 |
| 5,342,197 A | * | 8/1994 | Stein | A61C 5/85 433/155 |
| 5,460,525 A | | 10/1995 | Rashid | |
| 6,074,210 A | | 6/2000 | Garrison | |
| 6,234,793 B1 | * | 5/2001 | Brattesani | A61C 3/06 433/149 |
| 6,589,053 B2 | | 7/2003 | Bills | |
| 8,517,732 B2 | * | 8/2013 | Segal | A61C 5/85 433/155 |
| 9,517,110 B2 | | 12/2016 | McDonald | |
| 9,687,970 B2 | | 6/2017 | Chen | |
| D792,594 S | | 7/2017 | Nicholson | |
| D860,462 S | | 9/2019 | Webster | |
| D861,173 S | | 9/2019 | Webster | |
| D861,174 S | | 9/2019 | Webster | |
| 2011/0244421 A1 | | 10/2011 | Segal et al. | |
| 2018/0008375 A1 | | 1/2018 | Nicholson | |
| 2019/0060032 A1 | | 2/2019 | Webster | |

OTHER PUBLICATIONS

International Search Report and Written Opinion from PCT/US2018/048022 dated Oct. 18, 2018.

U.S. Appl. No. 29/702,590, filed Aug. 20, 2019.

\* cited by examiner

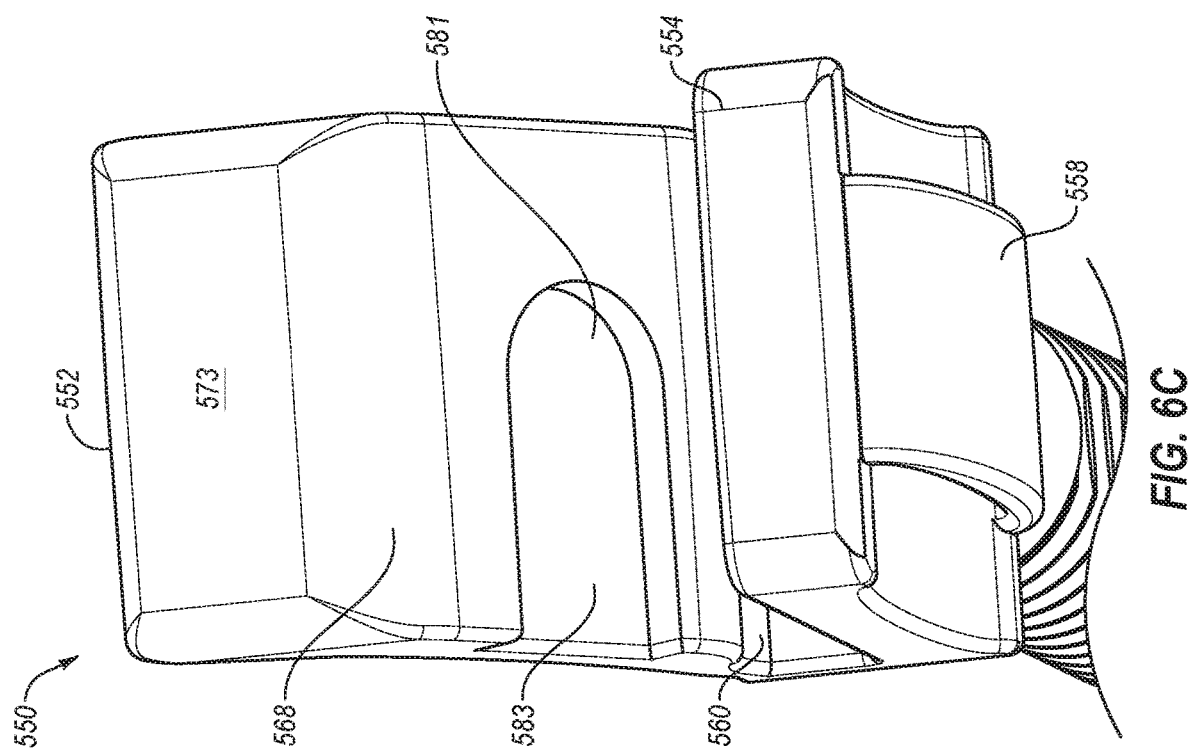

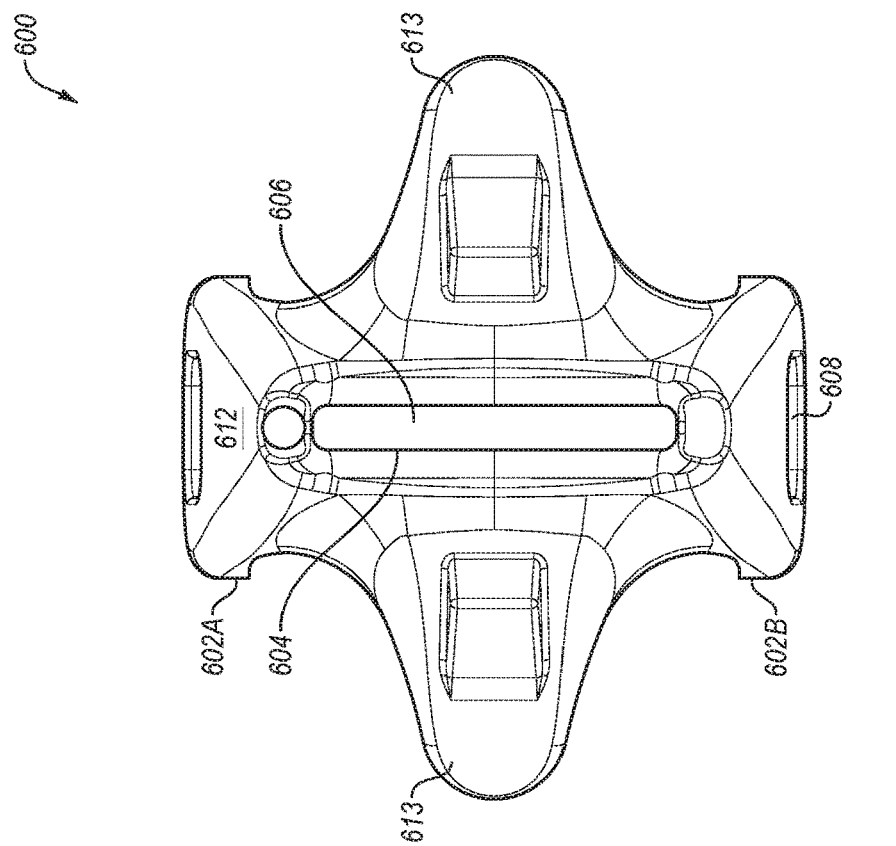
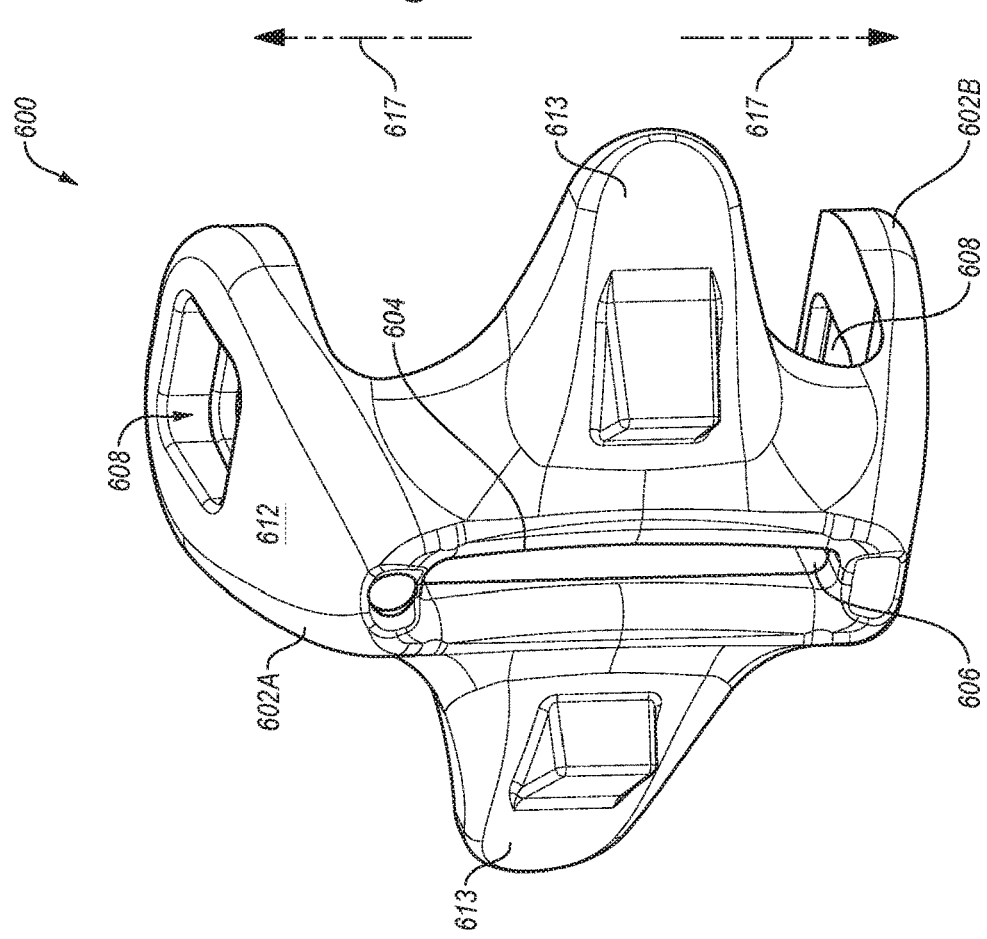
FIG. 8D
FIG. 8C

DENTAL MATRIX DEVICES

CROSS-REFERENCE TO RELATED APPLICATION

This application claims the benefit of and priority to U.S. Provisional Patent Application No. 62/550,549 filed Aug. 25, 2017, which is incorporated herein by reference in its entirety.

BACKGROUND

Field of the Invention

Embodiments of the present disclosure relate to dental devices for use in dental procedures. In particular, some embodiments relate to dental matrix devices.

Description of Related Art

Dental practitioners treat patients who have developed conditions such as cavities in a tooth. To treat cavities, the dental practitioner removes the infected portion of the tooth and then deposits a filling material into the tooth preparation. During a dental filling procedure, a band may be used to isolate the tooth having the cavities from one or more surrounding teeth. For instance, the band may be looped around the tooth. The band may at least partially define the desired shape of the restored tooth and may reduce or prevent the filling material from flowing to the surrounding teeth.

The dental practitioner may use a matrix device during the dental filling procedure. The matrix device may retain the band and may enable positioning of the band relative to the tooth. However, current dental matrix devices suffer from several drawbacks. In particular, some of the matrix device may fail to sufficiently hold the band relative to the tooth. Moreover, the matrix devices may make it difficult to release the band following the procedure.

The subject matter claimed herein is not limited to embodiments that solve any disadvantages or that operate only in environments such as those described. Rather, this background is only provided to illustrate one example technology area where some embodiments described herein may be practiced.

SUMMARY

A need therefore exists for a table that eliminates or diminishes the above-described disadvantages and problems.

An aspect of an embodiment is a dental matrix device. The dental matrix device may include a band, a body, a pivot head, a knob, and a clamp retainer. The band may be configured to be positioned around a tooth during a dental procedure. The band may define one or more openings such as an opening at each end. The band may exit the body at a first end and extend from the body through the pivot head. The body may include one or more features such as a pivot retainer portion, an attachment portion, an aperture, a clamp cavity that may extend through at least a portion of the body, and a ramp, which may slope towards the aperture. The pivot retainer portion may be configured to be attached to the pivot head. The aperture may be positioned between the attachment portion and the ramp. The knob may be configured to be attached to the attachment portion of the body. The knob may be rotatably secured to one end of the body. The clamp retainer may be at least partially positioned in the clamp cavity. The clamp retainer may include a threaded portion, a clamp portion, a tab, and a hinge. The threaded portion may interface with the knob such that rotation of the knob translates the clamp retainer in the clamp cavity. The clamp portion may include a levered portion and a base. The clamp portion may be configurable in two or more arrangements such as a first arrangement and a second arrangement. In the first arrangement, the levered portion and the base may be positioned in the body and/or the band may be retained by the clamp retainer. In the second arrangement, at least a portion of the levered portion may extend through the aperture and/or the band may be released from the clamp retainer. Translation of the clamp retainer in a first direction draws the clamp retainer into the clamp cavity and reduces a length of a portion of the band that extends from the body. Translation of the clamp retainer in a second direction pushes the levered portion up the ramp to transfer the clamp retainer from the first arrangement to the second arrangement to release the band from the clamp portion. The hinge may include a strip of material that may enable or partially enable the levered portion to rotate relative to the base. The hinge may enable rotation of the levered portion relative to the base such that a lower surface of the levered portion contacts or is positioned immediately adjacent to an upper surface of the base when the clamp retainer is configured in the first arrangement. The tab may extend from the upper surface of the base. The levered portion may define a tab slot, which may be configured to receive the tab. The tab slot may include a semi-cylindrical portion and a rectangular portion that extends out a side of the levered portion. In the first arrangement, the tab may be positioned in the openings of the band and in the tab slot of the levered portion. In the second arrangement, the tab may be withdrawn from the tab slot. The spring may extend from the base on a surface opposite the upper surface. The spring may be configured to press against an inner surface of the clamp cavity to force the base towards the levered portion. The aperture may be defined on a surface of an indentation of the body. The ramp may include a surface of the indentation and may slope towards the aperture. The levered portion may extend from the clamp cavity onto the ramp. As the levered portion is pressed up the ramp, the levered portion may move away from the base. Advantageously, the ramp and the levered portion may enable a dental practitioner to easily and reliably release the band from the body. This provides an improvement over other matrix devices that are pulled until the band breaks or other similar mechanisms. The pivot retainer portion may include a pivot retainer. The pivot retainer may include a particular shape such as being substantially square or another suitable shape. The pivot head may be configurable in multiple configurations and orientations, which may be based on or limited by the pivot retainer and the particular shape thereof. In detail, the pivot retainer may be substantially square and the pivot head may be configurable in three orientations relative to the body. Advantageously, the pivot head may enable a dental practitioner to place multiple matrix devices in a mouth of a patient concurrently. In particular, the dental practitioner may place a first dental matrix device and configure it in the first orientation (e.g., at a first angle), then place a second dental matrix device and configure the second matrix device in the second orientation. Such placement may reduce physical interference between the first and second matrix devices. The pivot head may include a central portion and two side portions. The two side portions may be connected by the central portion. The two side portions may be connected at about right angles to the central portion. The two side portions may be angled towards one another as the two side portions meet the central portion. The central portion may narrow as the central portion extends from the side portions. The central portion may define a central hole. The central hole may include one or more dimensions, which may be related to the band. In detail, the central hole may include an elongated dimension in a first direction defined between the two side portions and a width. The central hole may be configured to receive two ends of the band next to one another such that the band forms a loop, which may be positioned around a tooth. The central hole may include a width that is defined perpendicular to the first direction. The width may be smaller than the elongated dimension of the central hole. The pivot head may include a winged pivot head.

Another aspect is a dental matrix device. The dental matrix device may include a body, a pivot head, a knob, a band, and a clamp retainer. The body may include one or more geometries such as a clamp cavity, an aperture, and a ramp immediately adjacent to the aperture. The body may also include a pivot retainer portion at the first end and an attachment portion at a second end. The aperture may include an aperture into the clamp cavity and a ramp may be positioned near or immediately adjacent to the aperture. The band may be configured to be positioned around a tooth. The band may define one or more openings such as an opening at each end. The knob may be configured to be attached to the attachment portion of the body. The knob may be attached to the body such that the knob is secured relative to the body and rotates relative to the body. The clamp retainer may be at least partially positioned in the clamp cavity. The clamp retainer may include a threaded portion, a spring, a tab, and a clamp portion at a first end of the clamp retainer. The clamp portion may include one or more components such as a levered portion, a hinge, and a base. The levered portion may be rotatably connected to the base via the hinge. The tab may extend from the upper surface of the base. The levered portion may define a tab slot. The tab slot may be configured to receive the tab. The tab may be positioned in the openings of the band and in the tab slot of the levered portion. The tab slot may include a semi-cylindrical portion and a rectangular portion that extends out a side of the levered portion. Translation of the clamp retainer in a first direction may draw the clamp retainer into the clamp cavity such that a lower surface of the levered portion rotates towards an upper surface of the base. The translation of the clamp retainer in the first direction reduces a length of a portion of the band that extends from the body. Translation of the clamp retainer in a second direction may push the levered portion up the ramp to separate the lower surface of the levered portion from the upper surface of the base. The translation of the clamp retainer in the second direction may withdraw the tab from the tab slot and may enable release of the band from the clamp portion. The spring may extend from the base on a surface opposite the upper surface. The spring may be configured to press against an inner surface of the clamp cavity to force the base towards the levered portion. The threaded portion of the clamp retainer may interface with the knob. In detail, the threaded portion may interface with the knob such that rotation of the knob in a first rotational direction translates the clamp retainer in the clamp cavity in the first direction and rotation of the knob in a second rotational direction translates the clamp retainer in the clamp cavity in the second direction. The pivot head may be rotatably attached to the pivot retainer portion of the body. The band may exit the body at a first end and may extend from the body through the pivot head. The pivot retainer portion may include a pivot retainer that may include a particular shape such as being substantially square or another suitable shape. The pivot head may be configurable in multiple configurations and orientations that may be based on or limited by the pivot retainer and the particular shape thereof. In detail, the pivot retainer may be substantially square and the pivot head may be configurable in a first orientation relative to the body, a second orientation relative to the body, and a third orientation relative to the body. In the first orientation, the band may be at a first substantially right angle relative to the body. In the second orientation, the band may be substantially aligned with the body. In the third orientation, the band may be at a second substantially right angle relative to the body. The pivot head may include two side portions and a central portion. The central portion may be connected to the two side portions. The central portion may define a central hole that may be configured according to the band. In detail, the central hole may include an elongated dimension in a first direction between the side portions and a width in a second direction. The central portion may narrow as the central portion extends from the side portions. The two side portions may be angled towards one another. The pivot head may include a winged pivot head.

Yet another aspect of an embodiment includes a method of isolation of at least a portion of an outer surface of a tooth during a dental restorative procedure. The method may include positioning a band around at least a portion of a tooth. The band may be positioned around a tooth such that an inner side surface of the band is adjacent to at least a portion of an outer surface of the tooth. The method may include translating a clamp retainer in a first direction. The translating a clamp retainer in a first direction may draw the band into a clamp cavity which may be defined at least partially by a body of a dental matrix device. The clamp retainer may include a clamp portion having a levered portion that retains the band relative to the body and the clamp retainer may include a threaded portion. The translation of the clamp retainer in the first direction may reduce a length of a portion of the band that extends from the body. The translating the clamp retainer in the first direction may include rotating a knob in a first rotational direction. The knob may be interfaced with the threaded portion and may be attached to an attachment portion of the body. The method may include translating the clamp retainer in a second direction. The clamp retainer may be translated in a second direction following a dental restorative procedure. The translating the clamp retainer in the second direction may include pushing the levered portion up a ramp immediately adjacent to an aperture of the body. Pushing the levered portion up the ramp may separate the levered portion from a base of the clamp portion, which may release the band from the clamp portion. The levered portion may protrude from the clamp cavity through an aperture, which may be positioned near or immediately adjacent to the ramp. The translating the clamp retainer in the second direction may include rotating the knob in a second rotational direction. The method may include configuring a pivot head relative to a pivot retainer portion of the body. The pivot retainer portion may include a pivot retainer that is substantially square. The configuring the pivot head may include positioning the pivot head in one or more orientations such as in a first orientation relative to the body, in a second orientation relative to the body, and in a third orientation relative to the body. In the first orientation the band may be at a first substantially right angle relative to the body. In the second orientation, the band may be substantially aligned with the body. In the third orientation, the band may be at a second substantially right angle relative to the body.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

The appended drawings contain figures of preferred embodiments to further illustrate and clarify the above and other aspects, advantages, and features of the present invention. It will be appreciated that these drawings depict only preferred embodiments of the invention and are not intended to limit its scope. Additionally, it will be appreciated that while the drawings may illustrate preferred sizes, scales, relationships, and configurations of the invention, the drawings are not intended to limit the scope of the claimed invention. The invention will be described and explained with additional specificity and detail through the use of the accompanying drawings in which:

FIG. 6C illustrates another detailed view of the portion of the clamp release of FIG. 6A.

FIG. 8C illustrates an additional view of the winged pivot head of FIG. 8A;
FIG. 8D illustrates an additional view of the winged pivot head of FIG. 8A.

DESCRIPTION OF EMBODIMENTS

The present invention is generally directed towards dental matrix devices. The principles of the present invention, however, are not limited to the dental matrix devices explicitly described or depicted. It will be understood that, in light of the present disclosure, the dental matrix devices disclosed herein may have a variety of shapes, sizes, configurations, and arrangements. It will also be understood that dental matrix devices may include any suitable number and combination of features, components, aspects, and the like. In addition, while the dental matrix devices shown in the accompanying figures are illustrated as having particular styles, it will be appreciated that the dental matrix devices may have any suitable style or configuration.

Additionally, to assist in the description of various exemplary embodiments of the dental matrix devices, words such as top, bottom, front, rear, sides, right, and left are used to describe the accompanying figures which may be, but are not necessarily, drawn to scale. It will further be appreciated that the dental matrix devices may be disposed in a variety of desired positions or orientations, and used in numerous locations, environments, and arrangements. A detailed description of exemplary embodiments of the dental devices now follows.

Figure 1:
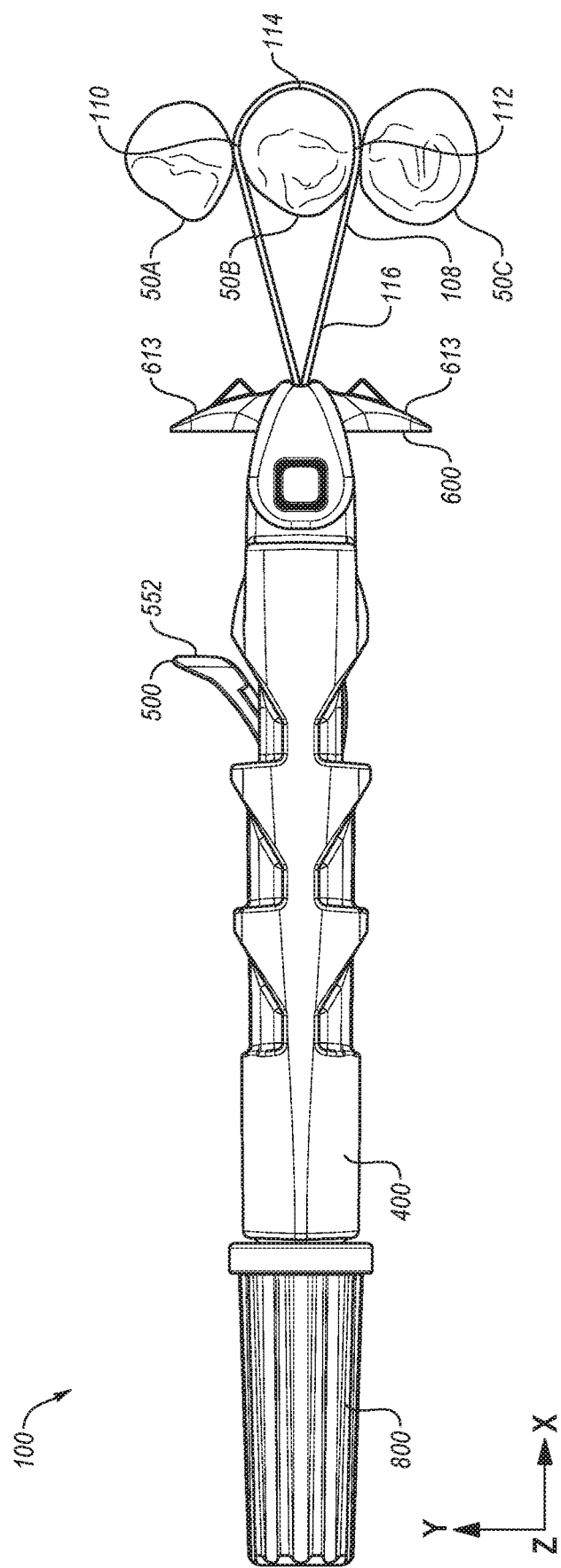
FIG. 1 illustrates an example of a first dental matrix device.
Figure 2:
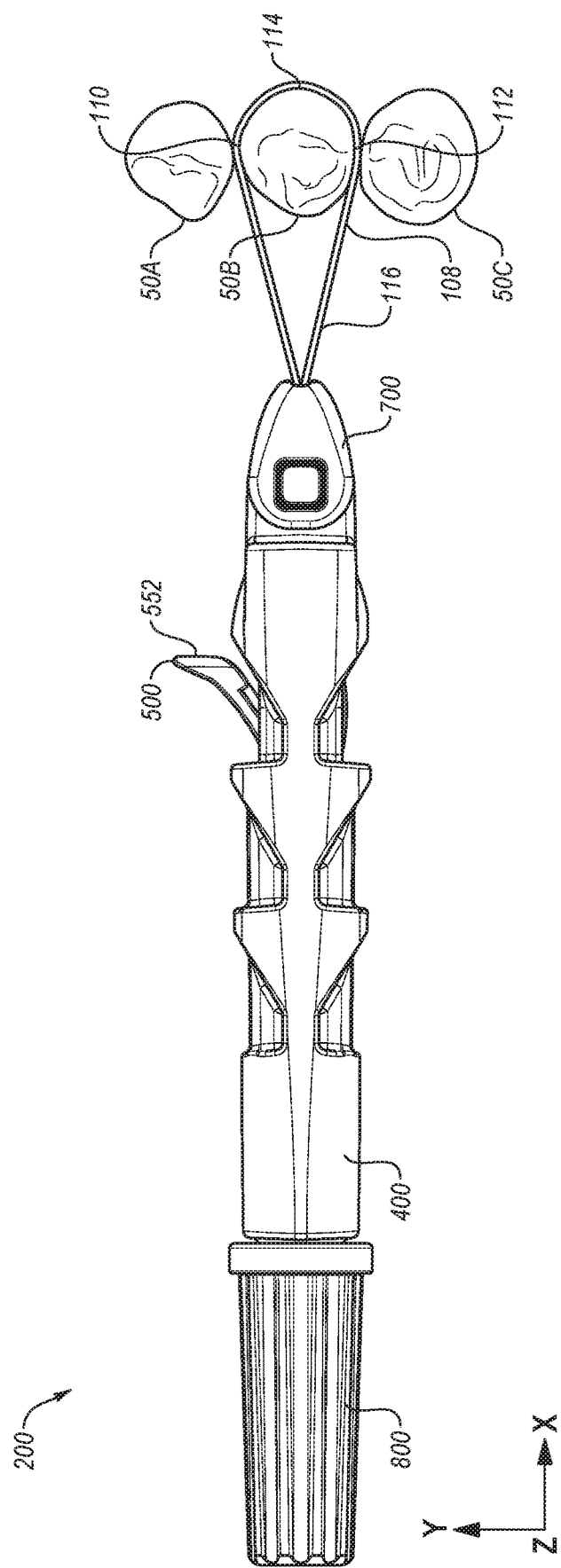
FIG. 2 illustrates an example of a second dental matrix device.
Figure 3:
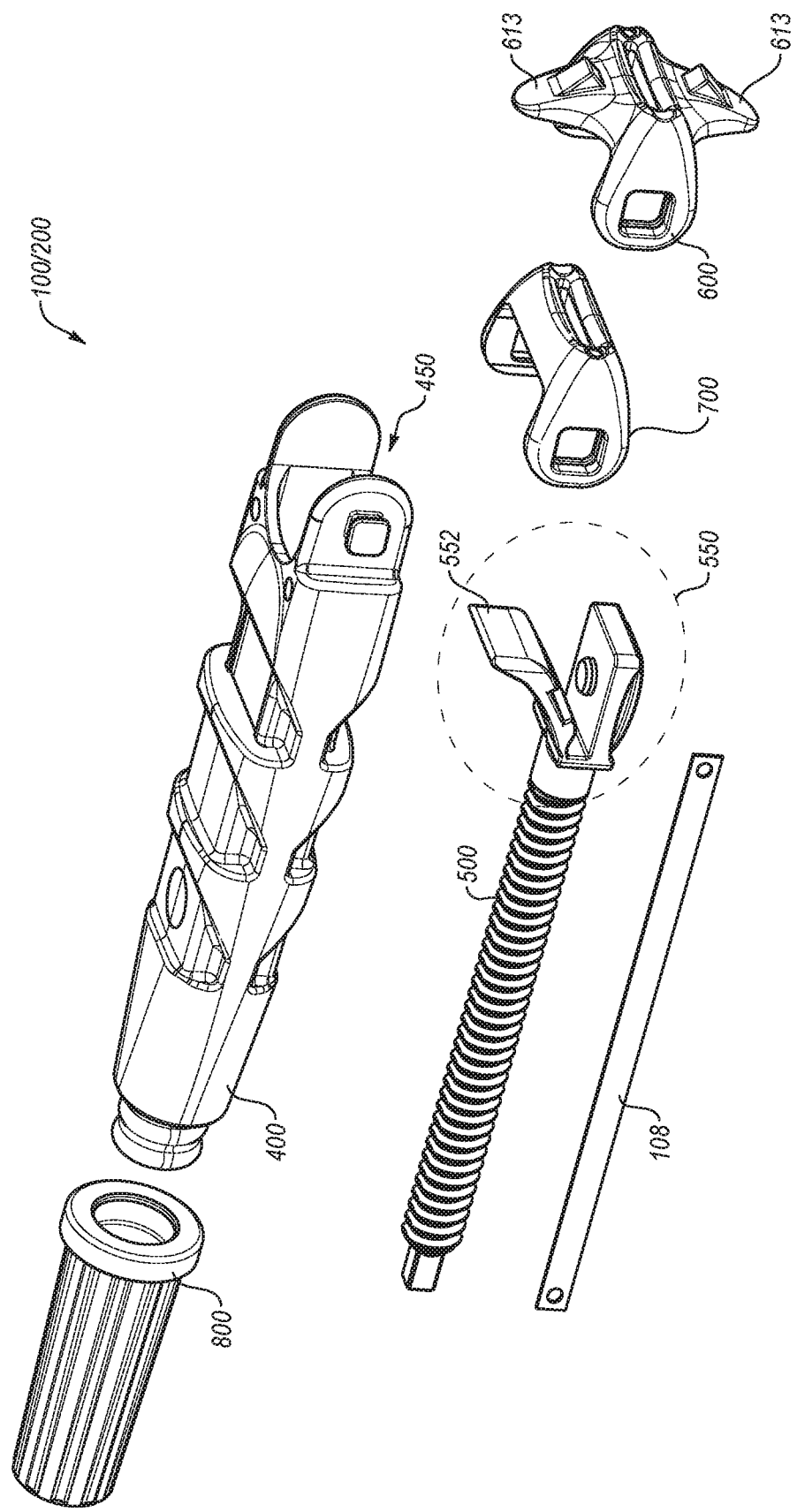
FIG. 3 illustrates an exploded view of the first dental matrix device and the second dental matrix device of FIGS. 1 and 2.

FIGS. 1-3 illustrate example dental matrix devices 100 and 200 (collectively, matrix devices 100/200). FIG. 1 illustrates an example first dental matrix device 100. FIG. 2 illustrates an example second dental matrix device 200. FIG. 3 illustrates an exploded view of the matrix devices 100/200 of FIGS. 1 and 2. In FIGS. 1 and 2, the matrix devices 100/200 are depicted interfaced with teeth 50A-50C (collectively, teeth 50 or generally, tooth 50). FIGS. 1 and 2 depict wear surfaces or bite surfaces of the teeth 50 that are opposite gums of a patient.

With reference to FIGS. 1 and 2, the matrix devices 100/200 are configured to position a band 108 around one of the teeth 50. For instance, in FIGS. 1 and 2, the matrix devices 100/200 position the band 108 around a central tooth 50B of the teeth 50. The band 108 may be loosely positioned around the central tooth 50B. The band 108 may then be tightened (as described below) such that at least a portion of the band 108 is in contact with one or more side surfaces of the central tooth 50B. The band 108 may isolate the central tooth 50B from a first tooth 50A and a second tooth 50C. While the central tooth 50B is isolated from the first tooth 50A and the second tooth 50C, a dental procedure or treatment may be performed on the central tooth 50B. Following the dental procedure or treatment, such as a Class II restoration, the matrix devices 100/200 may release the band 108 such that the band 108 may be removed from around the central tooth 50B.

For instance, initially, the band 108 may be positioned loosely around the central tooth 50B. When positioned loosely, the band 108 may not contact side surfaces of the central tooth 50B. The matrix devices 100/200 may then tighten the band 108 around the central tooth 50B. When the band 108 is tightened, portions of the band 108 may contact side surfaces of the central tooth 50B. For instance, the band 108 may include intra-tooth portions 110 and 112, which are positioned between the central tooth 50B and the first tooth 50A and between the central tooth 50B and the second tooth 50C. The intra-tooth portions 110 and 112 may contact side surfaces of the central tooth 50B. Additionally, the band 108 may include an internal band portion 114. The internal band portion 114 may contact an internal side surface of the central tooth 50B. The band 108 may also include an exterior portion 116. The exterior portion 116 may extend from the intra-tooth portions 110 and 112 to the matrix devices 100/200.

Following the dental procedure or treatment, the band 108 may be released. When released, the exterior portion 116 may be released from the matrix devices 100/200 and the portions of the band 108 are loose relative to the central tooth 50B. After the band 108 is released, a dental healthcare provider may remove the band 108 from around the central tooth 50B.

With reference to FIGS. 1 and 3, the first dental matrix device 100 may include a knob 800, a winged pivot head 600, a body 400, and a clamp retainer 500. With reference to FIGS. 2 and 3, the second dental matrix device 200 may include the knob 800, a pivot head 700, the body 400, and the clamp retainer 500. Each of these components are described relative to FIGS. 1-3.

The knob 800 and the winged pivot head 600 or the knob 800 and the pivot head 700 are removably attached to the body 400. The clamp retainer 500 is positioned in a clamp cavity 450 (FIG. 3) defined by the body 400. The clamp cavity 450 may be a passageway extending through the body 400 between openings on opposite ends of the body 400. The knob 800 rotates relative to the body 400. Rotation of the knob 800 translates the clamp retainer 500 in the clamp cavity 450. The translation of the clamp retainer 500 may tighten the band 108 around the central tooth 50B. Additionally, translation of the clamp retainer 500 releases the band 108 such that the band 108 can be removed from the central tooth 50B.

For example, the band 108 may be retained in a clamp portion 550 (FIG. 3) of the clamp retainer 500. As the clamp retainer 500 is translated in a negative x direction (e.g., via rotation of the knob 800 in a first direction), the band 108 may be drawn into the body 400, which may tighten the band 108 around the central tooth 50B. The clamp cavity 450 may be sized and configured to house the clamp retainer 500 such that the clamp portion 550 may freely move back and forth in the x and negative x directions within the body 400.

Following the dental procedure or treatment, the knob 800 may be rotated in a second direction (opposite the first direction). The rotation in the second direction may translate the clamp retainer 500 in the x-direction. Translation of the clamp retainer 500 in the x-direction may push the band 108 from the body 400, which may loosen the band 108 relative to the central tooth 50B. In addition, the translation of the clamp retainer 500 in the x-direction may press a levered portion 552 of the clamp retainer 500 up (in the y-direction) a section of the body 400. The section of the body 400 may be ramped or otherwise shaped, to facilitate movement of the levered portion 552 of the clamp retainer 500. The levered portion 552 may be attached to the remaining portion of the clamp retainer 500 via a hinge point, fulcrum point, or other point of increased flexibility that enables the levered portion 552 to hinge or pivot about the hinge point. As the clamp retainer 500 is translated in the x-direction, the band 108 may loosen and the levered portion 552 may press against the ramped section of the body 400, which rotates the levered portion 552 of the clamp retainer 500. The rotation may open up the clamp portion 550 and disrupt or disengage a connection between the clamp portion 550 and the band 108. The band 108 may then be released from the matrix devices 100/200.

Additionally or alternatively, following the dental procedure or treatment, the knob 800 may be rotated an additional amount in the first direction. Such rotation translates the clamp retainer 500 an additional amount in the negative x-direction. As the clamp retainer 500 is translated in a negative x-direction, the band 108 may be further drawn into the body 400. The band 108 may then tear, which may release the band 108 from the matrix devices 100/200. The band 108 may then be removed from around the central tooth 50B.

With reference to FIGS. 1 and 3, the first dental matrix device 100 includes the winged pivot head 600. With reference to FIGS. 2 and 3, the second dental matrix device 200 includes the pivot head 700. The winged pivot head 600 and the pivot head 700 may orient the band 108 relative to the body 400. For example, the band 108 may be fixed in the clamp portion 550 of the clamp retainer 500. The band 108 may extend from the clamp portion 550 from the clamp cavity 450. The band 108 may then be routed through an opening in the winged pivot head 600 or the pivot head 700 to the central tooth 50B. The winged pivot head 600 and the pivot head 700 may be configured to change the orientation of the winged pivot head 600 and the pivot head 700 relative to the body 400, which may further change the orientation of the band 108 relative to the body 400.

In FIGS. 1 and 2, the winged pivot head 600 and the pivot head 700 are depicted in-line with the body 400. For example, a long dimension of the body 400 is oriented parallel to the x-axis. In the in-line orientation, the band 108 is extended in substantially the same direction as the long dimension of the body 400.

The orientation of the winged pivot head 600 and the pivot head 700 may change such that the band 108 extends at an angle relative to the body 400. For instance, the band 108 may extend at about 90 degrees, 45 degrees, or another suitable angle. Modification of the angle between the band 108 and the body 400 may enable a dental healthcare provider to use multiple matrix devices (e.g., matrix devices 100/200) concurrently and/or may enable the matrix devices 100/200 to be moved such that the dental healthcare provider may access or more readily access a portion of the teeth 50.

The winged pivot head 600 includes wings 613. The wings 613 may assist in reorientation of the winged pivot head 600 relative to the body 400. For instance, a provider may press on the wings 613, which may rotate the winged pivot head 600 relative to the body 400. Some additional details of the winged pivot head 600 are provided below.

Modifications, additions, or omissions may be made to the matrix devices 100/200 without departing from the scope of the present disclosure. Moreover, the separation of various components in the embodiments described herein is not meant to indicate that the separation occurs in all embodiments. It may be understood with the benefit of this disclosure that the described components may be integrated together in a single component or separated into multiple components.

Figure 4A:
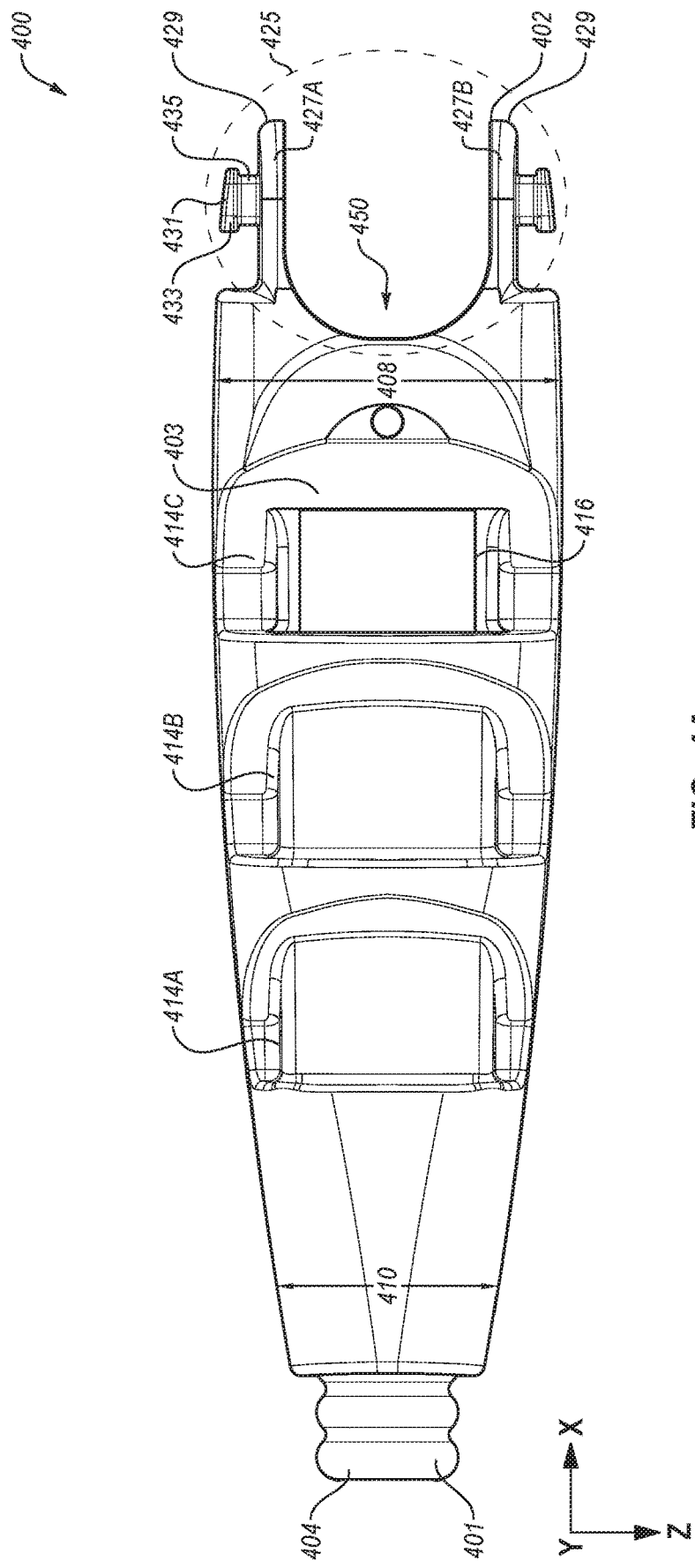
FIG. 4A illustrates an example body that may be implemented in the first dental matrix device and the second dental matrix device of FIGS. 1 and 2.
Figure 4B:
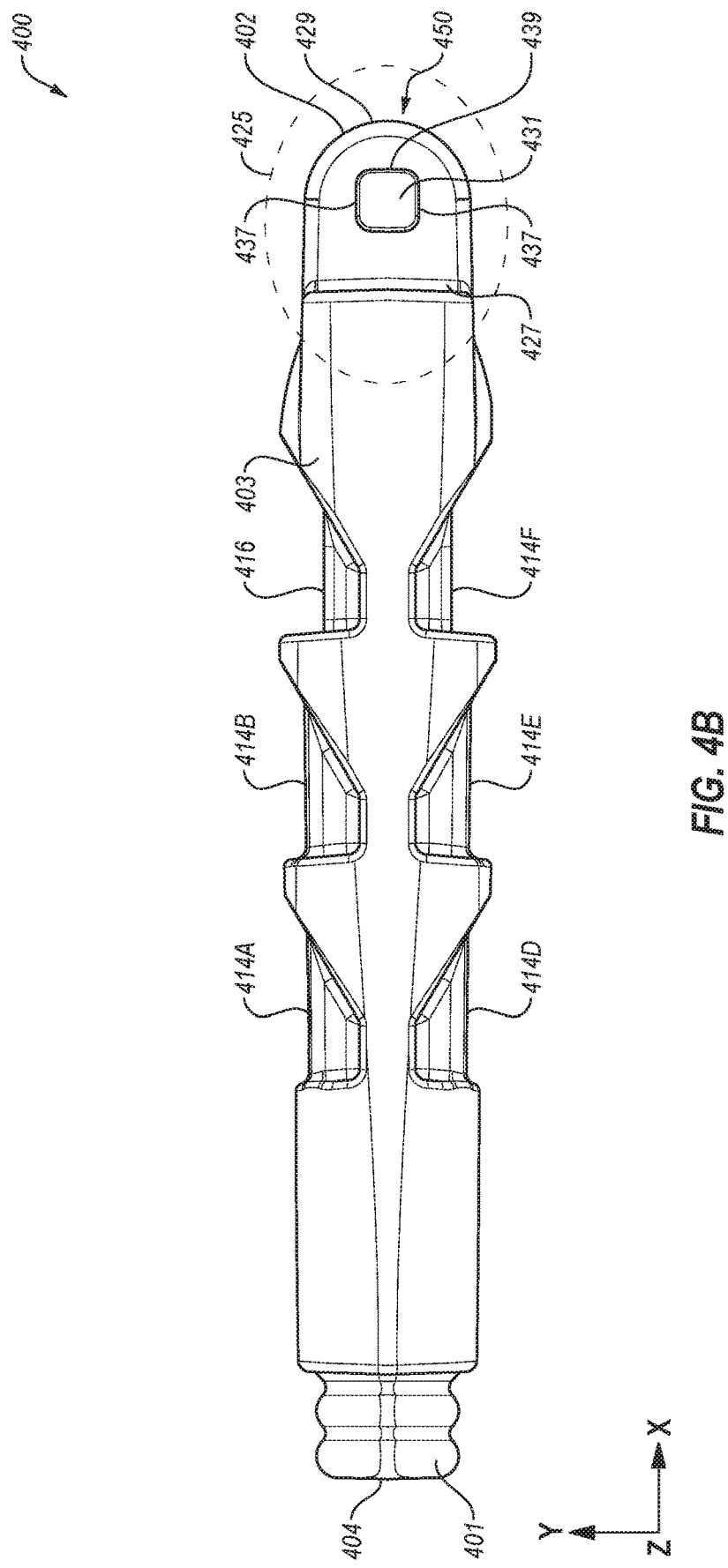
FIG. 4B illustrates another view of the body of FIG. 4A.
Figure 4C:
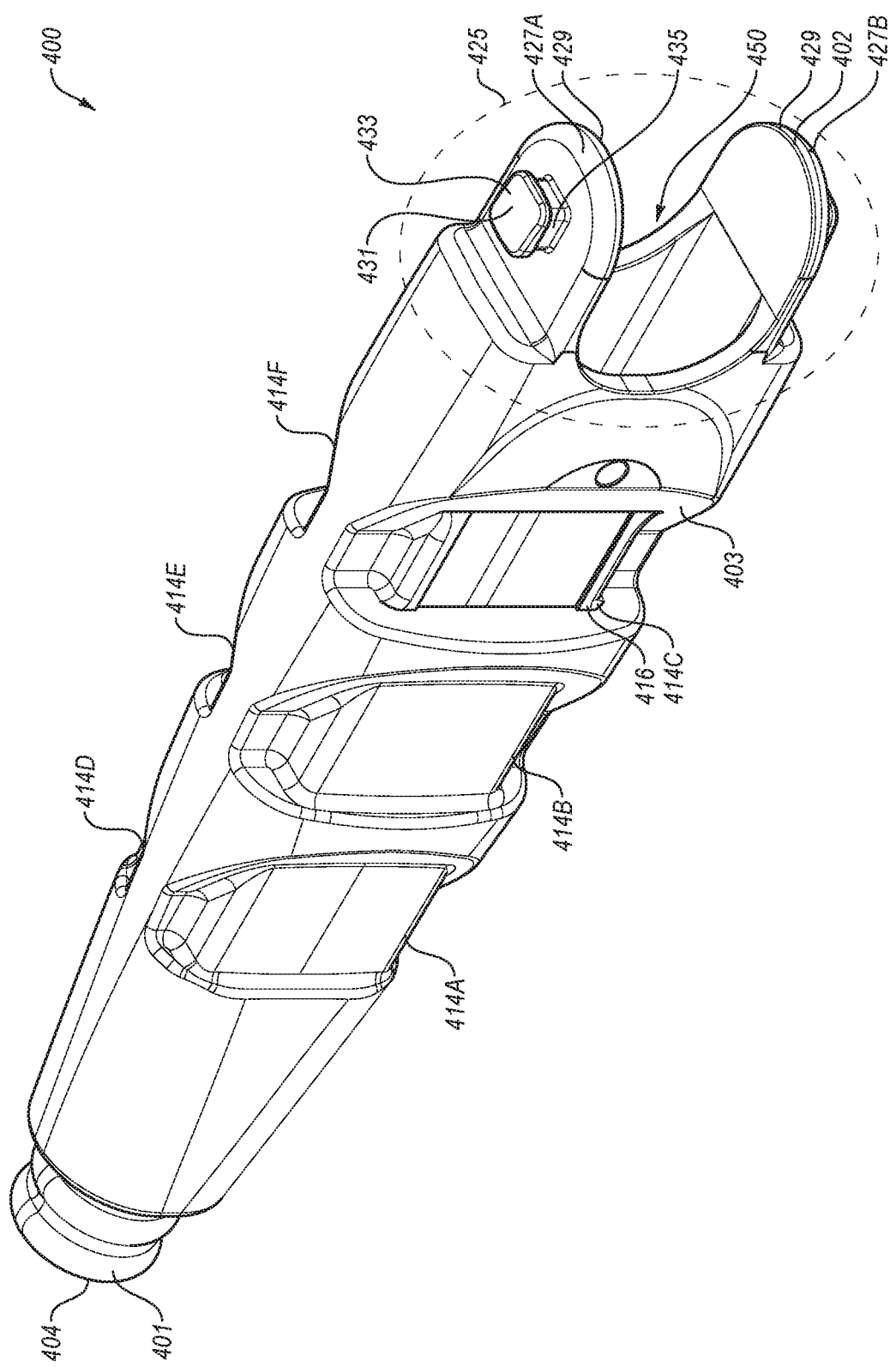
FIG. 4C illustrates another view of the body of FIG. 4A.

FIGS. 4A-4C illustrate an example embodiment of the body 400 that may be implemented in the matrix devices 100/200 of FIGS. 1-3. FIG. 4A depicts a top view of the body 400. FIG. 4B depicts a side view of the body 400. FIG. 4C depicts a perspective view of the body 400.

The body 400 includes a structure that is substantially hollow within which the clamp cavity 450 is defined. The body 400 extends from a first end 404 on Which a knob (e.g., the knob 800) may be attached to a second end 402 on which a pivot head (e.g., the pivot head 700 or the winged pivot head 600) may be attached. As best shown in FIG. 4A, a width of the body 400 may be defined in a direction substantially parallel to the z-axis. The width of the body 400 may taper from the second end 402 to the first end 404. For example, a first width 408 that is defined near the second end 402 may be greater than a second width 410 defined near the first end 404.

At the first end 404, the body 400 may include an attachment portion 401. The attachment portion 401 may be configured to interface with a knob such as the knob 800 described elsewhere in the present disclosure. The attachment portion 401 may be configured to retain the knob relative to the body 400, and to enable rotation of the knob relative to the body 400. For instance, the attachment portion 401 may be configured to enable rotation about an axis that is substantially parallel to the x-axis of FIG. 4A. In some embodiments, the attachment portion 401 may be configured to enable attachment of the knob without a fastener. For example, the knob 800 may be coupled with the body 400 at the attachment portion 401 by a snap fit, interference fit, or another suitable coupling mechanism.

The body 400 may define one or more indentations 414A-414F (generally, indentation 414 or indentations 414). Three of the indentations 414 may be defined on each face of the body 400. One or more of the indentations 414 may be configured to enable a better grip on the body 400. For instance, a user may place their finger in one of the indentations 414.

In addition, one or more of the indentations 414 may include a window 416. The window 416 is an aperture in the structure of the body 400. The window 416 enables components positioned in the clamp cavity 450 or portions thereof to exit the clamp cavity 450. For instance, the window 416 may enable a portion of the clamp retainer such as the clamp retainer 500 to selectively protrude from the clamp cavity 450. In the embodiments of FIGS. 4A-4C, the window 416 may be substantially rectangular and may be defined on a surface of the indentation 414. In other embodiments, the window 416 may include another shape such as an arced shape, an elongated shape, or another suitable shape.

The indentation 414 that includes the window 416 (in FIGS. 4A-4C a third indentation 414C) may include a ramp 403. The ramp 403 may slope towards the window 416. The ramp 403 may be configured to lift a levered portion (e.g., 552 of FIGS. 1-3) of a clamp retainer (e.g., 500 of FIGS. 1-3), which may release a band (e.g., the band 108) from the clamp retainer. The ramp 403 may be positioned adjacent or immediately adjacent to at least one portion of the window 416. For instance, the ramp 403 may be positioned along one of the sides of the window 416, and may slope downward in the direction of the first end 404, as shown in FIGS. 4A-4C.

The body 400 may include a pivot retainer portion 425. The pivot retainer portion 425 may include two pivot arms 427A and 427B (generally, pivot arm 427 or pivot arms 427). The pivot arms 427 may extend in a positive x-direction on each side of the structure of the body 400. In the embodiments of FIGS. 4A-4C, the pivot arms 427 may include a rounded edge 429 opposite the body 400.

In addition, a pivot retainer 431 may protrude from each of the pivot arms 427. With reference to FIG. 4A, the pivot retainers 431 may extend in the z-direction and the negative z-direction. The pivot retainers 431 may be configured to retain a pivot head (e.g., the pivot head 700 or the winged pivot head 600) relative to the body 400. The pivot retainers 431 of FIGS. 4A-4C may include a head 433 defined on the free end of the pivot retainers 431. The head 433 may be wider than a neck 435 that is attached to the pivot retainer 431.

In the embodiment of FIGS. 4A-4C, the pivot retainers 431 may include a substantially square cross-section. With reference to FIG. 4B, the square cross-section may be oriented on the pivot arms 427 such that sides 437 of the pivot retainers 431 are substantially aligned with the faces of body 400 and substantially parallel to the XZ-plane. Additionally, the square cross-section may be oriented on the pivot arms 427 such that an end 439 of the pivot retainers 431 is substantially perpendicular to the faces of the body 400 and parallel to the YZ-plane.

The substantially square cross-section may enable orientation of the pivot head relative to the body 400. For instance, the pivot head may be positioned in-line with the body 400 and may be positioned at about 90 degrees relative to the body 400.

In other embodiments, the pivot retainers 431 may include another cross-sectional shape. For example, the pivot retainers 431 may be triangular, hexagonal, pentagonal, etc. The shape of the pivot retainers 431 may be determined based on a number of orientations of the pivot head relative to the body 400. For instance, the pivot retainers 431 having a square cross-section may enable three orientations. Embodiments of the pivot retainers 431 having a pentagonal shape may enable four orientations.

Figure 5A:
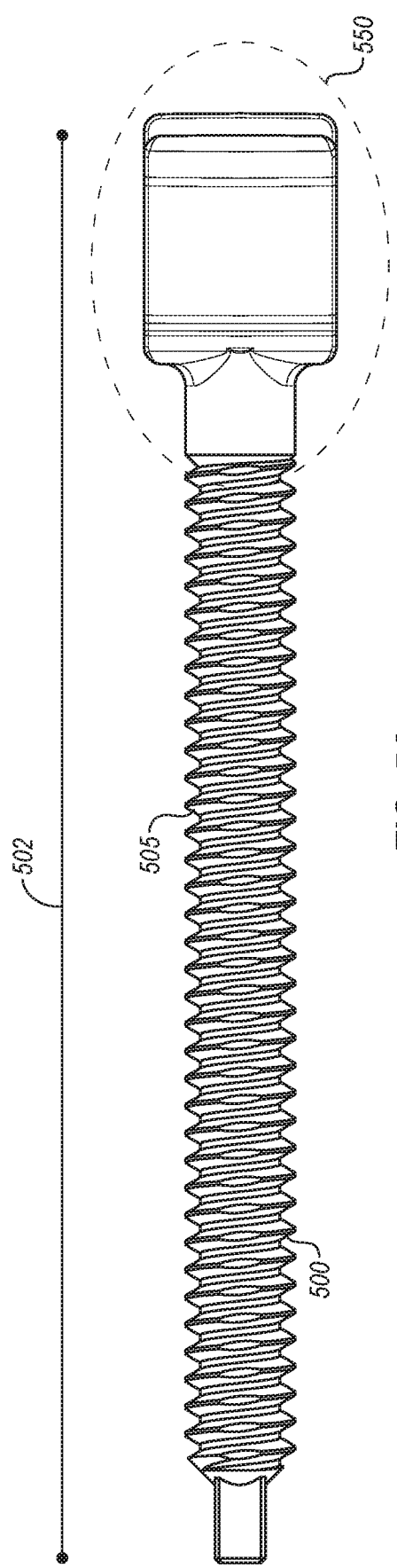
FIG. 5A illustrates an example clamp release that may be implemented in the first dental matrix device and the second dental matrix device of FIGS. 1 and 2.
Figure 5B:
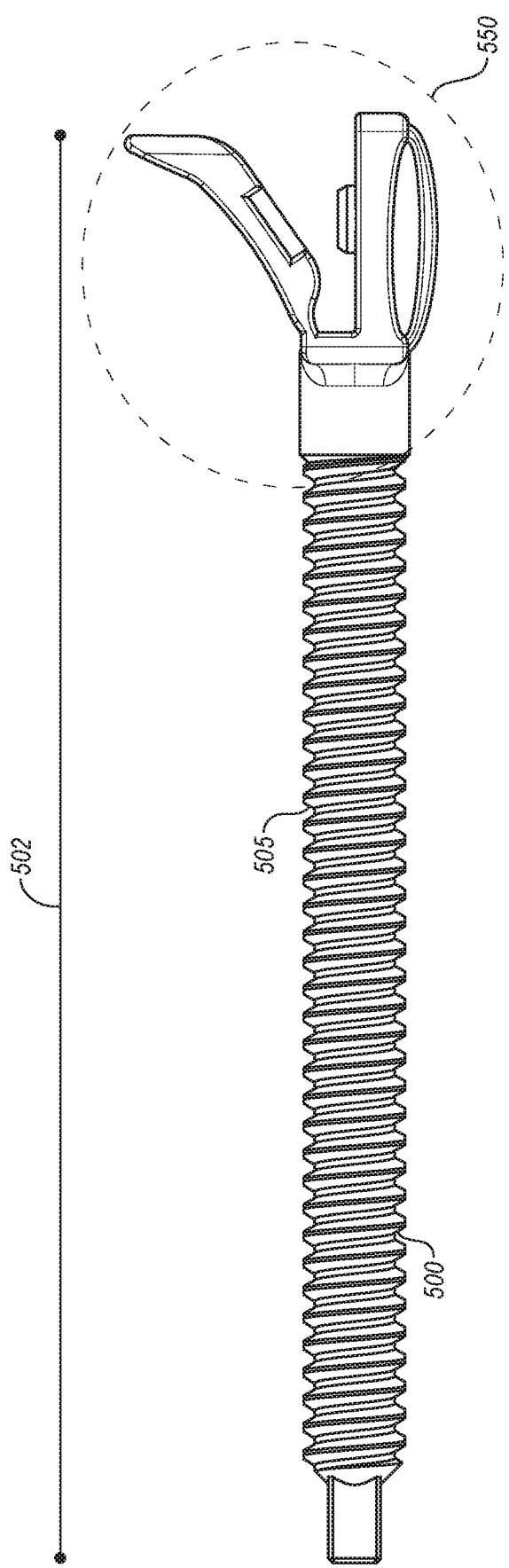
FIG. 5B illustrates another view of the clamp release of FIG. 5A.
Figure 5C:
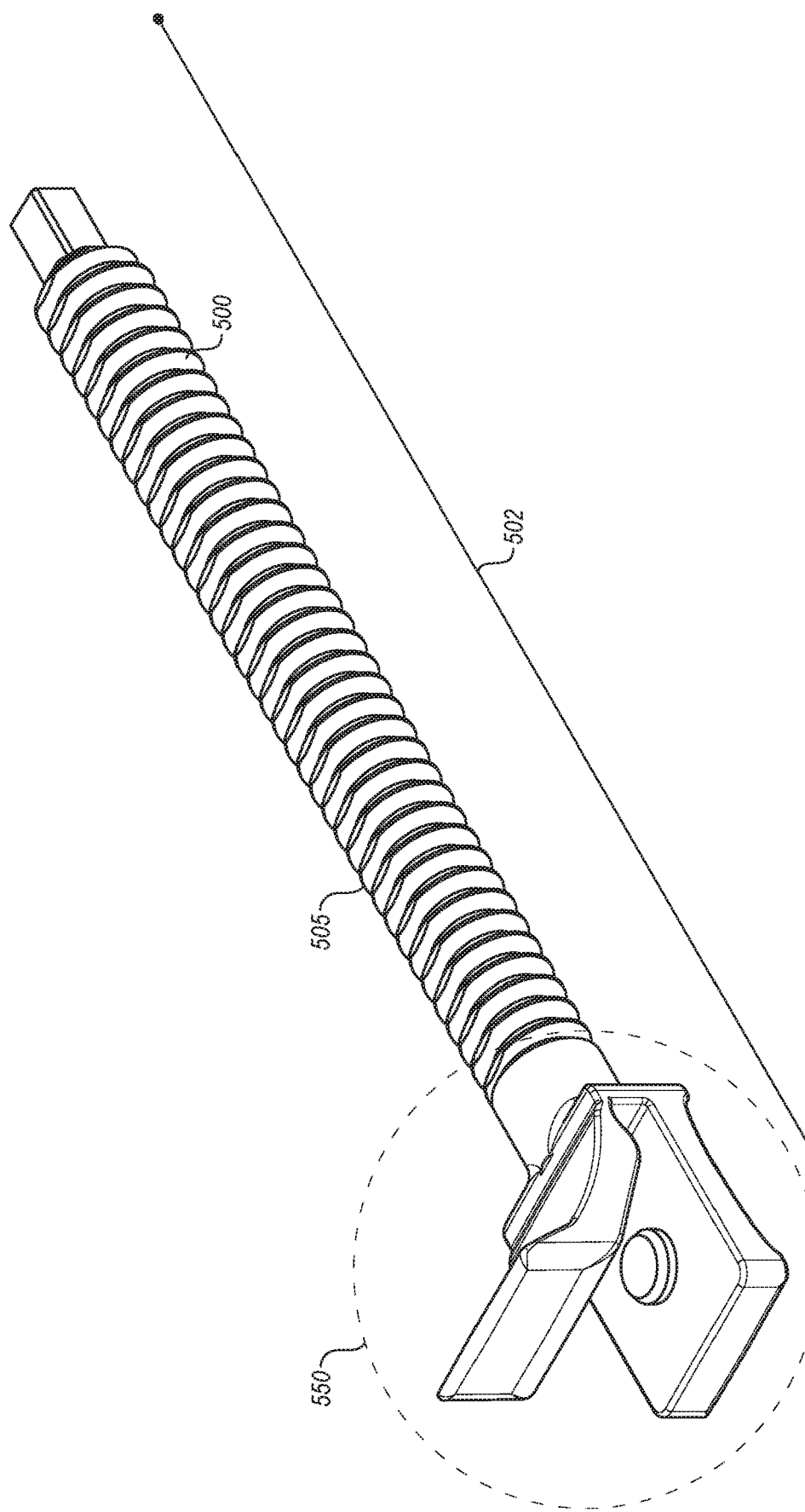
FIG. 5C illustrates another view of the clamp release of FIG. 5A.

FIGS. 5A-5C illustrate an example embodiment of the clamp retainer 500 that may be implemented in the matrix devices 100/200 of FIGS. 1-3. FIG. 5A is a top view of the clamp retainer 500. FIG. 5B is a side view of the clamp retainer 500. FIG. 5C is a perspective view of the clamp retainer 500.

The clamp retainer 500 may be configured to selectively retain a band (e.g., the band 108). For example, the clamp retainer 500 may be configured to retain the band during a dental procedure or treatment. Through movement of the clamp retainer 500 relative to a body such as the body 400, the band may be tightened around a tooth of a patient. Additionally, through movement of the clamp retainer 500, the band may be released such that the band may be removed from around the tooth of the patient.

The clamp retainer 500 may include a threaded portion 505 that is connected to a clamp portion 550. The threaded portion 505 may have an elongate or rod-like structure and may include threads defined on an outer surface. The threads may be configured to interface with a threaded sub-volume of a knob such as the knob 800. Rotation of the knob 800 relative to the threaded portion 505 may translate the clamp retainer 500. The clamp portion 550 is attached at a first end of the threaded portion 505. The clamp portion 550 may be configured to selectively retain a band. Some details of the clamp portion 550 are provided below with reference to FIGS. 6A-6C.

The clamp retainer 500 may be sized and shaped to be positioned within a clamp cavity defined in a body such as the clamp cavity 450 of the body 400. In addition, the clamp retainer 500 may be sized to translate within the clamp cavity 450 of the body 400. For instance, a length 502 of the clamp portion 550 may be about equal to a length of the body 400. In addition, the clamp portion 550 may be substantially rectangular to fit within the clamp cavity 450.

Figure 6A:
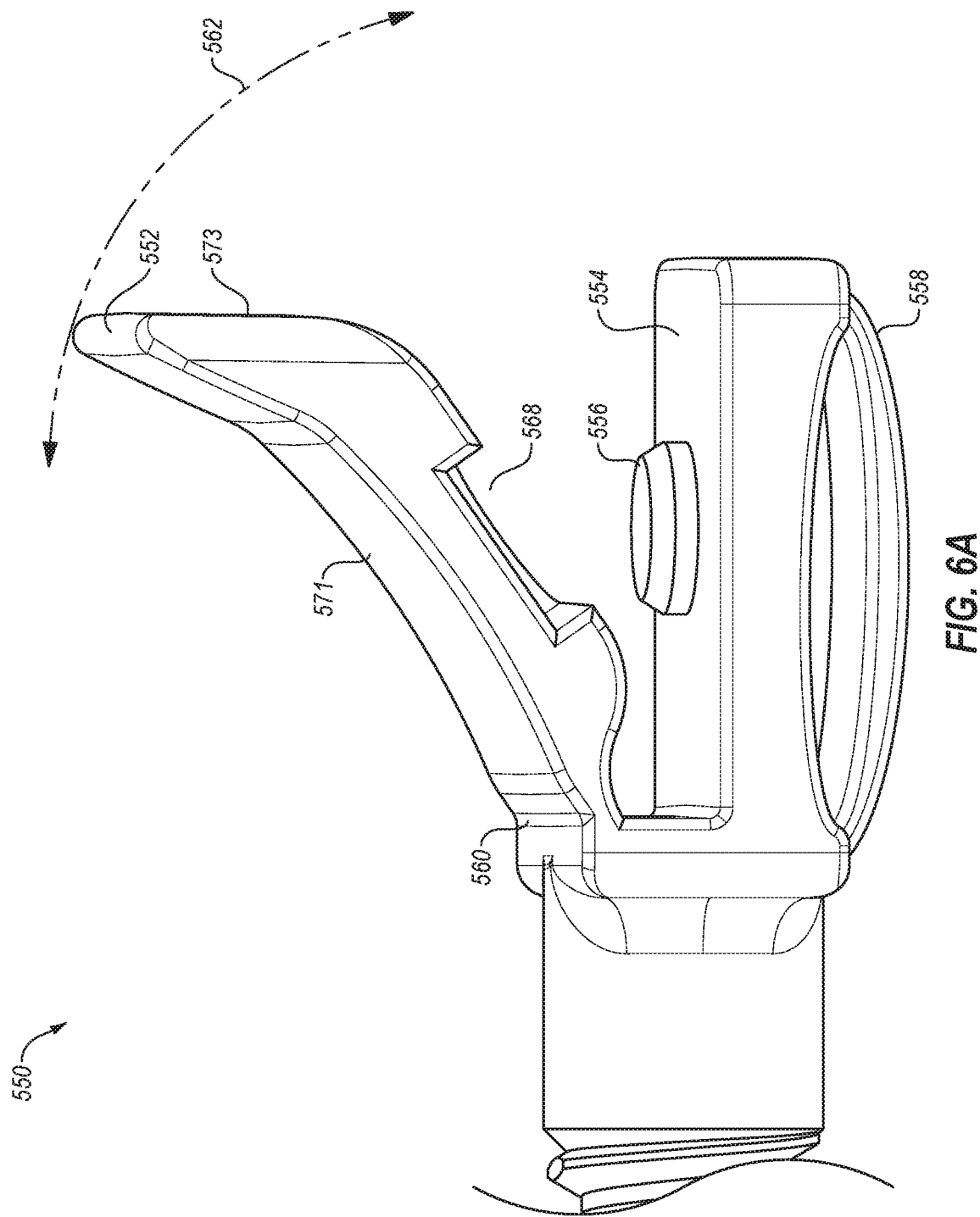
FIG. 6A illustrates a detailed view of a portion of the clamp release of FIG. 5A.
Figure 6B:
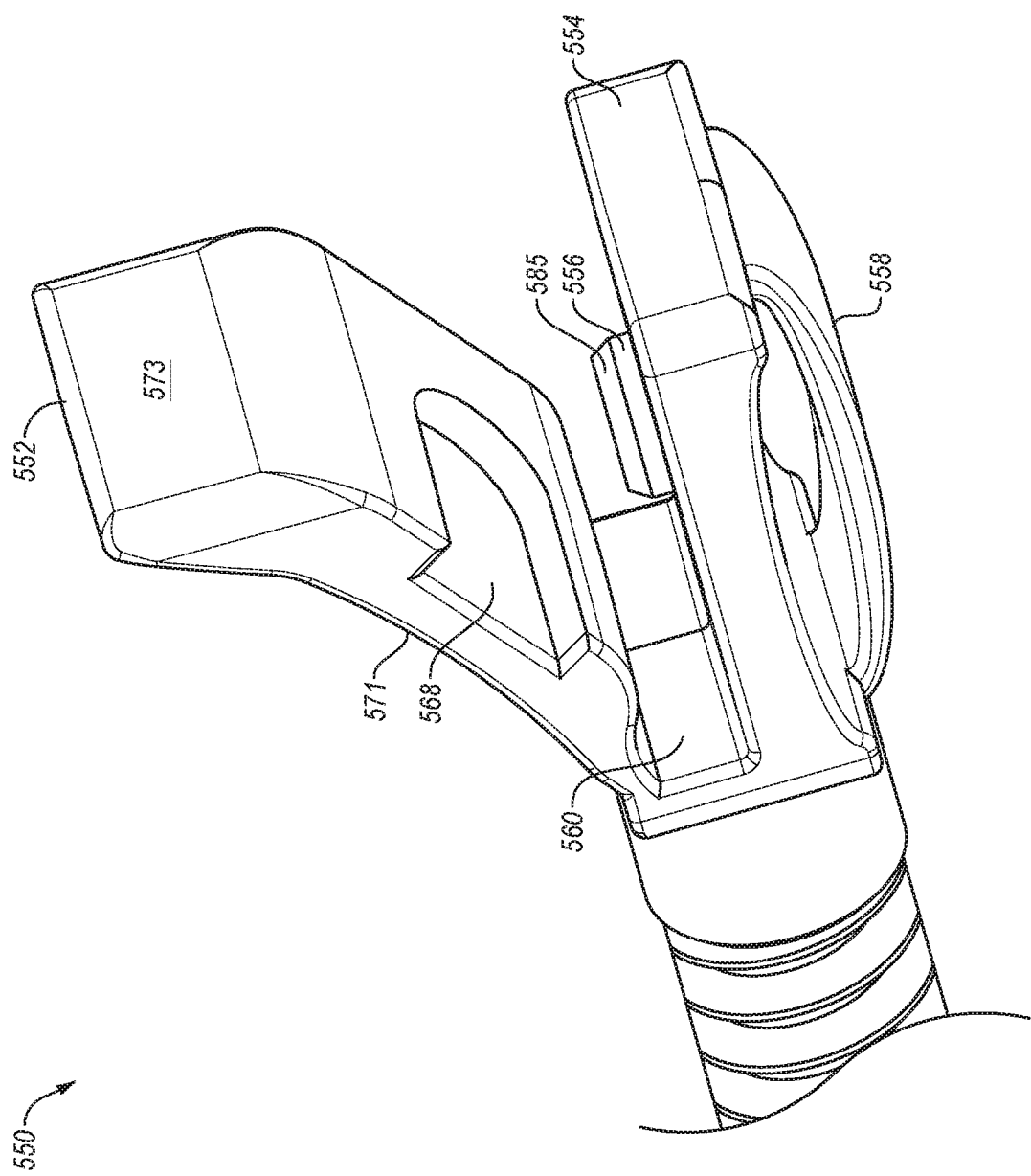
FIG. 6B illustrates another detailed view of the portion of the clamp release of FIG. 6A.

FIGS. 6A-6C illustrate detailed views of the clamp portion 550 of the clamp retainer 500 of FIGS. 5A-5C. FIG. 6A depicts a side view of the clamp portion 550. FIG. 6B depicts a first front perspective view of the clamp portion 550. FIG. 6C depicts a second front perspective view of the clamp portion 550.

The clamp portion 550 may include the levered portion 552, a base 554, a tab 556, and a spring 558. The levered portion 552 may be connected to the base 554 via a hinge 560. The levered portion 552 may include an elongated structure that extends from the hinge 560. The levered portion 552 may include a lower surface that is configured to contact or be immediately adjacent to the base 554. The lower surface may connect to a front face 573 that includes an angled surface that slopes away from the base 554. The angled surface is configured to contact the ramp 403 to pivot the levered portion 552 relative to the base 554.

The hinge 560 may include a narrow strip of material that enables the levered portion 552 to rotate relative to the base 554. For example, the levered portion 552 may rotate along an arrow 562 of FIG. 6A. The levered portion 552 may rotate such that a lower surface of the levered portion 552 may contact or be immediately adjacent to an upper surface of the base 554.

A body such as the body 400 may rotate the levered portion 552 relative to the base 554. For instance, with reference to FIGS. 2 and 6A, as the clamp retainer 500 translates in a negative x-direction, the body 400 may contact a rear face 571 of the levered portion 552, which may force the levered portion 552 in a clockwise direction. Additionally, as the clamp retainer 500 translates in the positive x-direction, the front face 573 of the levered portion 552 may contact the ramp 403 of the body 400. The ramp 403 may push the levered portion 552 away from the base 554.

Referring back to FIGS. 6A-6C, the levered portion 552 may define a tab slot 568. The tab slot 568 may be defined in the lower surface of the levered portion 552. As best shown in FIG. 6C, the tab slot 568 may include a semi-cylindrical portion 581 and a rectangular portion 583. The rectangular portion 583 extends out one side of the levered portion 552. The rectangular portion 583 may include a dimension that is substantially equal to a diameter of the semi-cylindrical portion 581.

The tab 556 may extend from the base 554 in a direction towards the levered portion 552. The tab 556 may be substantially cylindrical and may have a chamfered portion 585 (FIG. 6B) at the end opposite the base 554. The chamfered portion 585 may increase effectiveness of a release of a band that is disposed by the clamp portion 550. For instance, a reduction in the diameter of the tab 556 may reduce a likelihood that the band is caught by the tab 556.

The tab slot 568 may be defined such that the tab 556 may be positioned and disposed in the tab slot 568. For instance, when the levered portion 552 is positioned against the base 554 (e.g., rotated towards the base 554), the tab 556 may be positioned in the tab slot 568. The tab 556 may include a diameter that is substantially similar to the semi-cylindrical portion 581 of the tab slot 568.

The spring 558 may extend from the base 554. The spring 558 may include a strip of material that is flexible yet rigid. For instance, in the depicted embodiment, the spring 558 includes an arc of material with a void defined between the spring 558 and the base 554. The spring 558 may be configured to secure the clamp portion 550 in the clamp cavity 450.

Figure 7A:
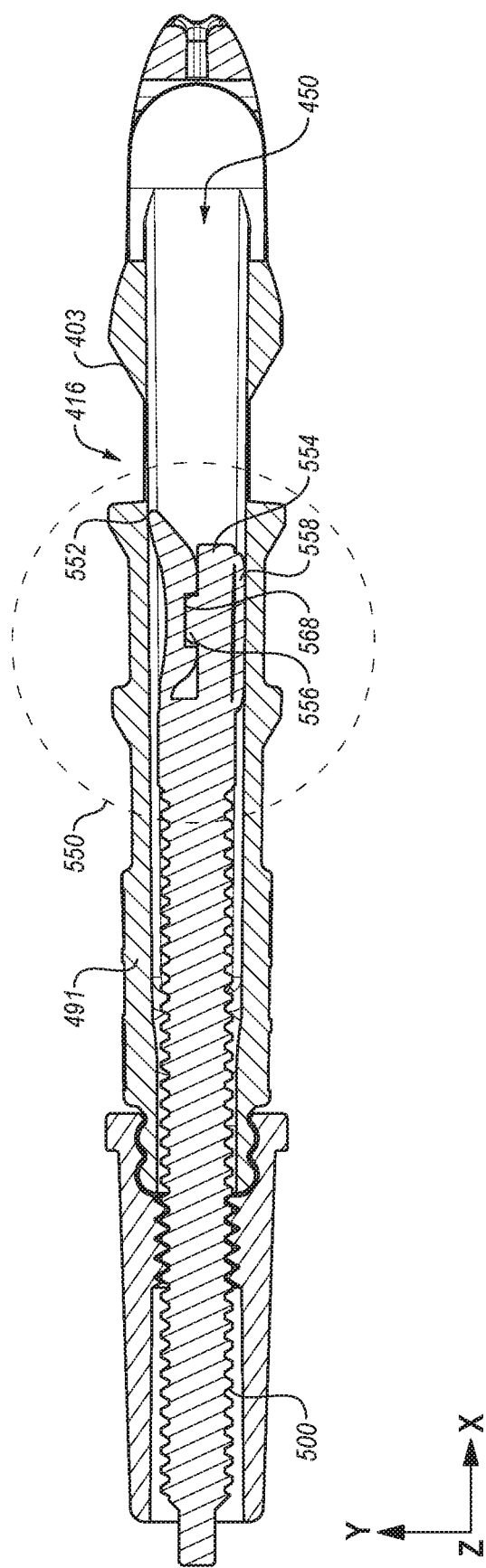
FIGS. 7A and 7B illustrate an example subassembly of the clamp release of FIGS. 5A-6C with the body of FIGS. 4A-4C.
Figure 7B:
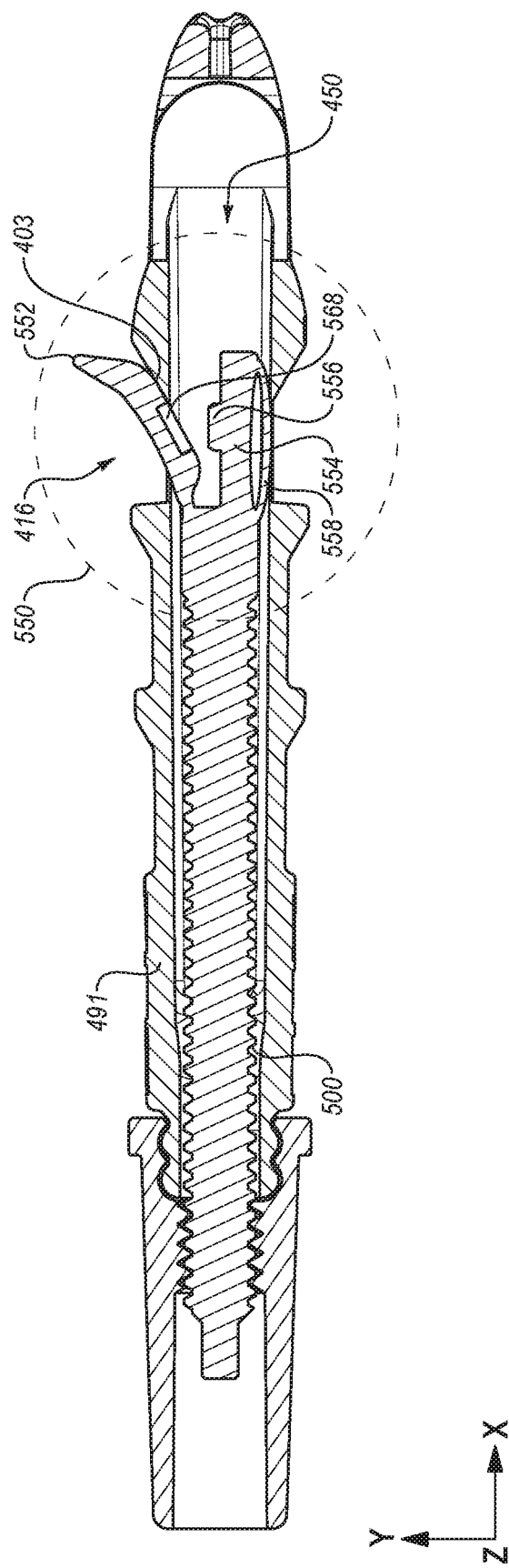

FIGS. 7A and 7B illustrate an example subassembly of the clamp retainer 500 of FIGS. 5A-6C with the body 400 of FIGS. 4A-4C. FIG. 7A depicts the clamp retainer 500 in a first position relative to the body 400. FIG. 7B depicts the clamp retainer 500 in a second position relative to the body 400.

In the first position of FIG. 7A, the clamp portion 550 of the clamp retainer 500 is positioned in the clamp cavity 450. For example, the levered portion 552 or at least some portion thereof is positioned within the clamp cavity 450. An upper wall 491 of the clamp cavity 450 may contact the levered portion 552 and may press the levered portion 552 towards the base 554. In the first position, the tab 556 may be positioned in the tab slot 568. The spring 558 may press the levered portion 552 against the upper wall 491.

With reference to the FIGS. 3 and 7A, the band 108 may include holes that may be placed over the tab 556. As the clamp retainer 500 is configured in the first position, the clamp portion 550 may retain the band 108 by pressing the tab 556 into the tab slot 568. As the clamp retainer 500 is translated in the negative x direction, the band 108 may be drawn into the clamp cavity 450, which may tighten the band 108 around a tooth.

In the second position of FIG. 7B, the levered portion 552 may contact the ramp 403. The ramp 403 may lift the levered portion 552 from the base 554 such that the tab 556 is no longer positioned in the tab slot 568. As the levered portion 552 is pushed up the ramp 403, a portion of the levered portion 552 may protrude from the window 416.

Referring back to the FIGS. 3 and 7A, with the levered portion 552 separate from the base 554, the holes of the band 108 may be removed from the tab 556. Accordingly, in the second position of FIG. 7B, the band 108 may be released from the clamp portion 550. As described above, to transition from the first position to the second position, the clamp retainer 500 may be translated in the clamp cavity 450. For example, the clamp retainer 500 may be translated in substantially the x-direction of FIGS. 7A and 7B.

Figure 8A:
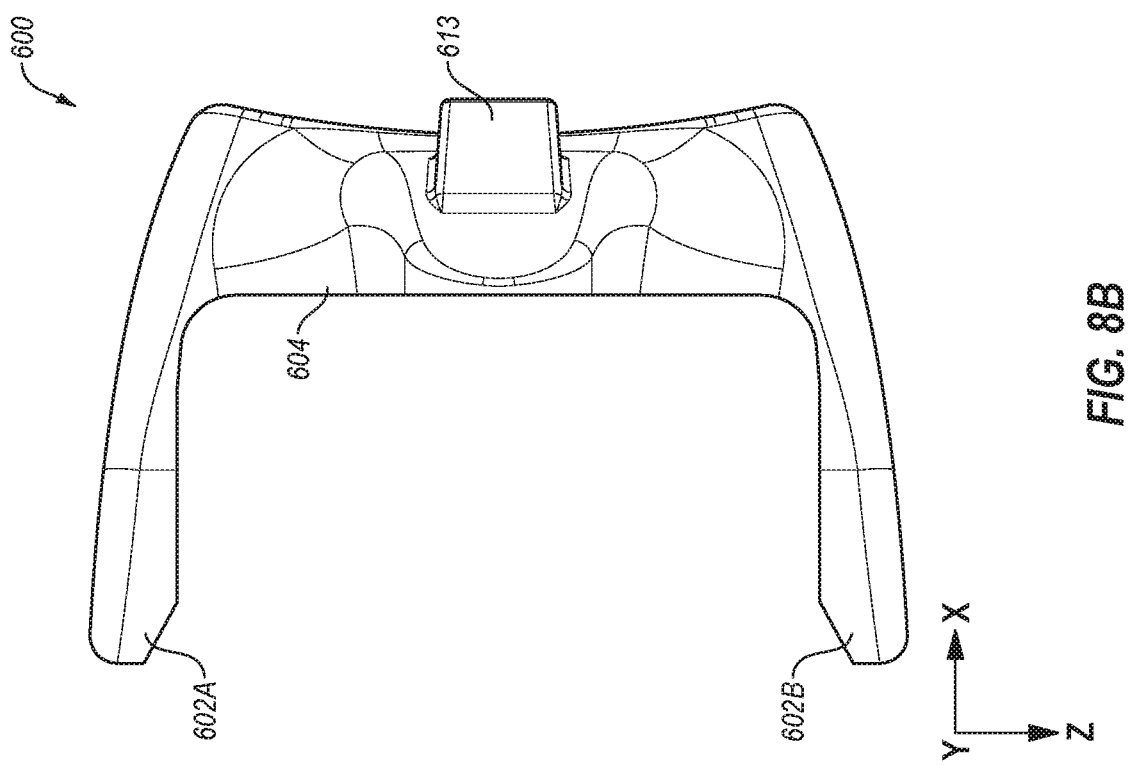
FIG. 8A illustrates an example winged pivot head that may be implemented in the first dental matrix device of FIG. 1.
Figure 8B:
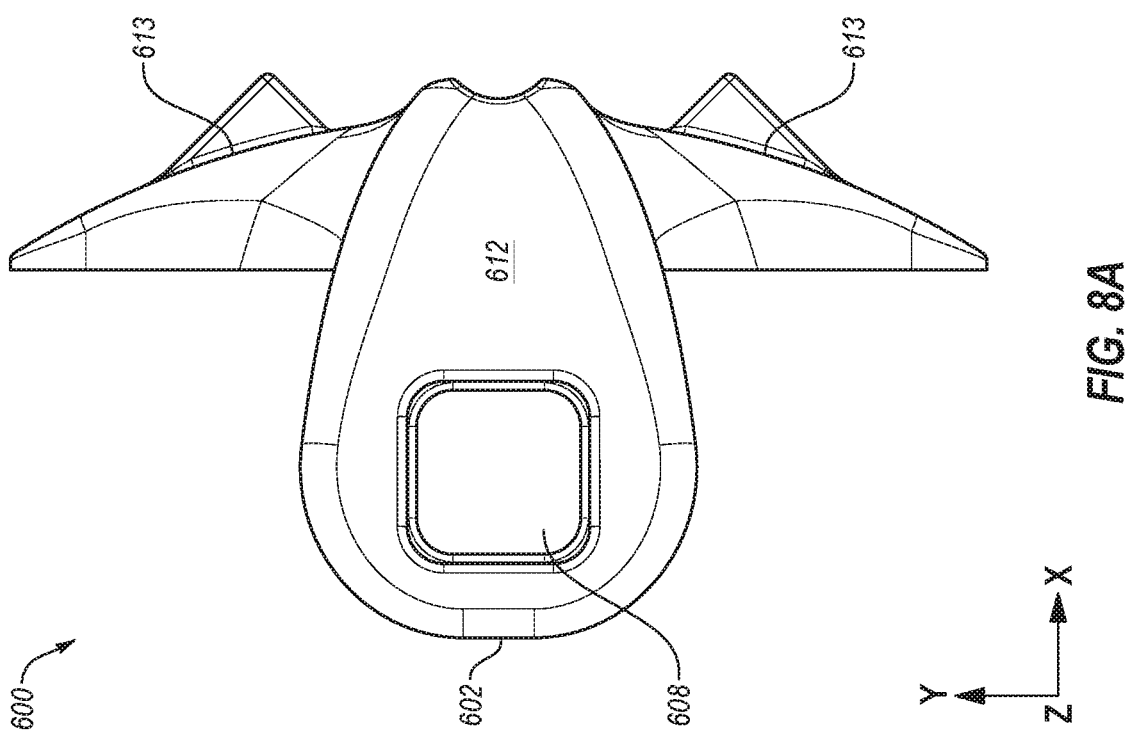
FIG. 8B illustrates an additional view of the winged pivot head of FIG. 8A.

FIGS. 8A-8D illustrate an example embodiment of the winged pivot head 600 that may be implemented in the first dental matrix devices 100 of FIGS. 1 and 3. FIG. 8A depicts a side view of the winged pivot head 600. FIG. 8B depicts a top view of the winged pivot head 600. FIG. 8C is a perspective view of the winged pivot head 600. FIG. 8D depicts a front view of the winged pivot head 600.

With reference to FIGS. 8A and 8B, the winged pivot head 600 may include two side portions 602A and 602B (generally, side portion 602 or side portions 602) that are connected by a central portion 604. The wings 613 may also extend from the central portion 604. For example, the side portions 602 may extend in the negative x-direction from the central portion 604. Additionally, the wings 613 may extend in a y-direction and in a negative y-direction.

In some embodiments, the side portions 602 may be connected to the central portion 604 at about right angles. For instance, the side portions 602 may be oriented at about 90 degrees relative to the central portion 604. Similarly, the wings 613 may be connected to the central portion 604 at about right angles. For instance, the wings 613 may be oriented at about 90 degrees relative to the central portion 604. The side portions 602 may be angled towards one another as they meet the central portion 604. For example, as the side portions 602 meet the central portion 604, the side portions 602 may extend towards one another.

With reference to FIGS. 8C and 8D, the central portion 604 may narrow as the central portion 604 extends from the side portions 602. The central portion 604 may define a central hole 606. The central hole 606 may be elongated in a first direction defined between the side portions 602. The central hole 606 may include a width defined perpendicular to the first direction. The width may be smaller than the elongated dimension in the first direction. The central hole 606 may be configured to receive a band such as the band 108 of FIGS. 1-3. For example, the band may be looped around a tooth or positioned in the central hole 606.

With reference to FIGS. 8A and 8C, the side portions 602 may each define an opening 608. For example, the openings 608 of each of the side portions 602A and 602B are shown in FIG. 8C. The openings 608 may be configured to receive a pivot retainer such as the pivot retainers 431 of the body 400. The openings 608 may be configured to retain the pivot retainers 431, which may attach the pivot head 600 to the body 400. In the depicted embodiment, the openings 608 include a rounded square cross section. For instance, as seen in FIG. 8A, the rounded square cross section of the opening 608 is shown. The openings 608 may extend through the side portions 602.

In some embodiments, the openings 608 may include a stepped wall. For instance, the stepped wall may define a volume closer to an exterior surface 612 that is greater than an inner volume, which is closer to an inner surface opposite the exterior surface. The stepped wall may be configured to accommodate the head and a neck (e.g., head 433 and neck 435) of a pivot retainer.

The stepped wall of the openings 608 enables the pivot head 600 to interlock/engage with the body (e.g., 400) during use. For instance, when a band (108 of FIG. 3) is tightened, the tension in the band 108 may create a pressure on the side portions 602. The pressure is represented in FIG. 8C by arrows 617. The pressure 617 may be oriented in a direction that causes the side portions 602 to spread apart from one another and to become disengaged with the pivot retainers. The stepped wall prevents the side portions 602 from becoming disengaged with the pivot retainers. Specifically, the stepped wall engages with the pivot retainers in a direction substantially opposite that of of the pressure 617.

The rounded square cross section of the opening 608 may enable the pivot head 600 to be positioned in three orientations relative to the body 400. Some additional details of the orientations are described with reference to FIGS. 11A-11C.

Figure 9B:
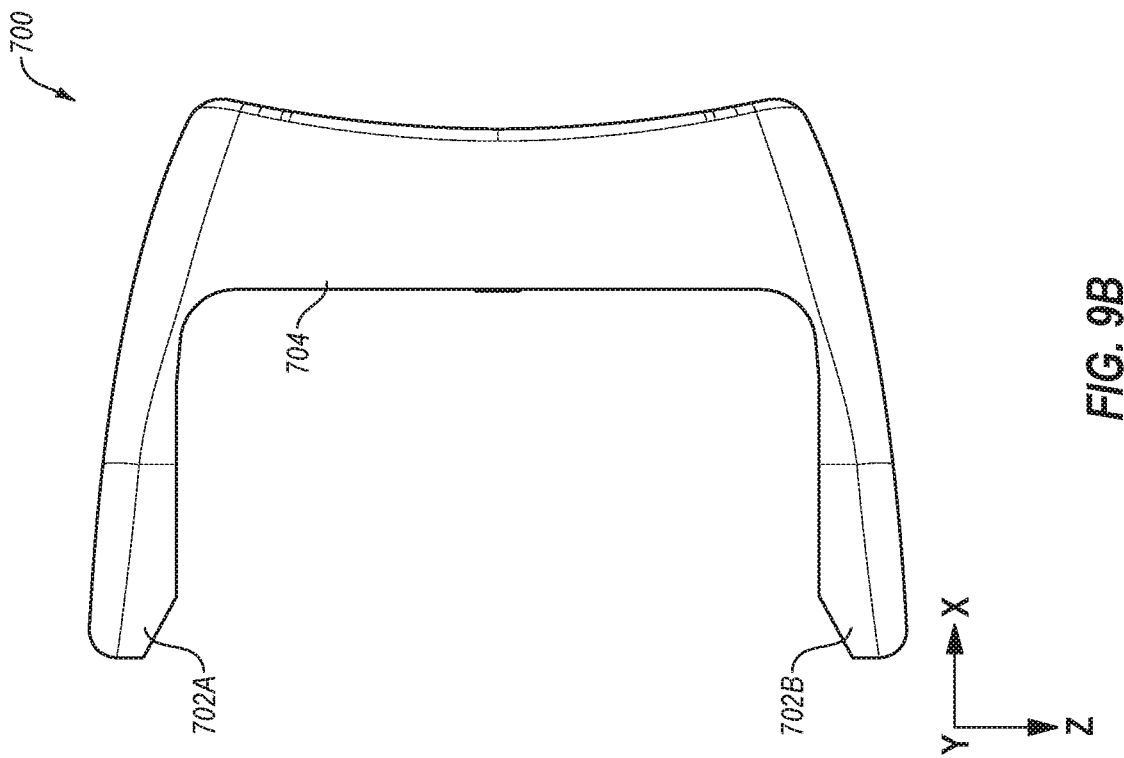
FIG. 9B illustrates an additional view of the pivot head of FIG. 9A.
Figure 9A:
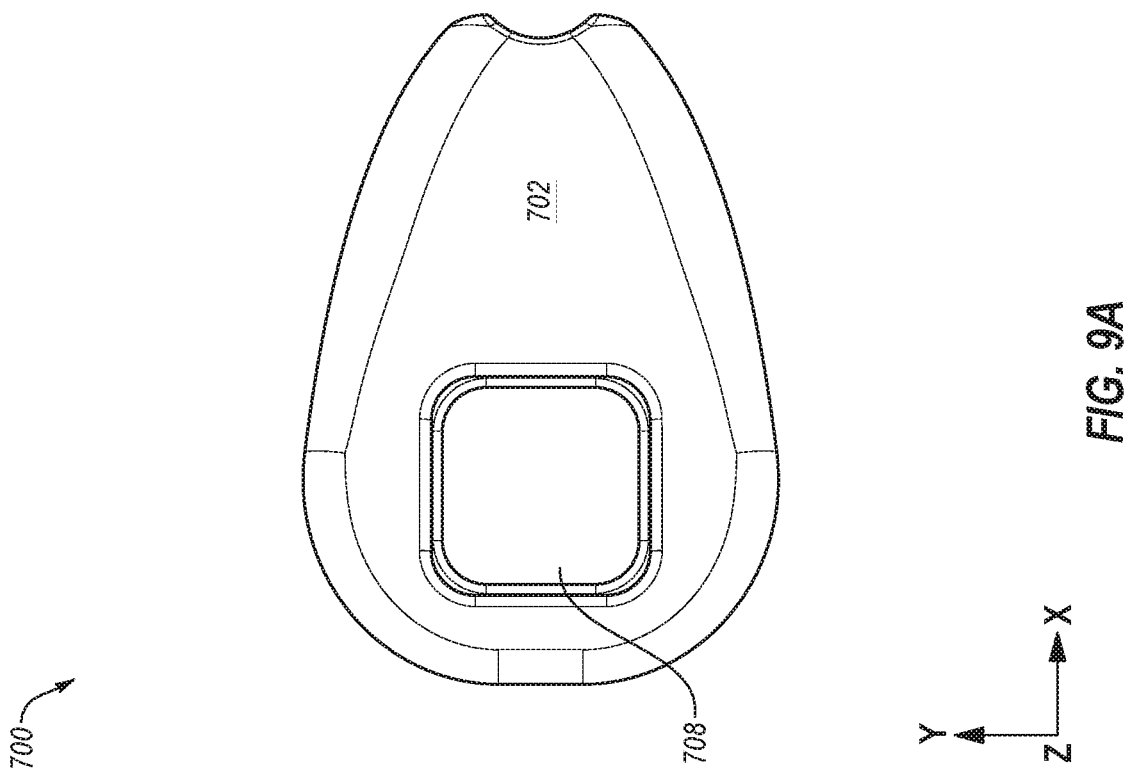
FIG. 9A illustrates an example pivot head that may be implemented in the second dental matrix device of FIG. 2.
Figure 9D:
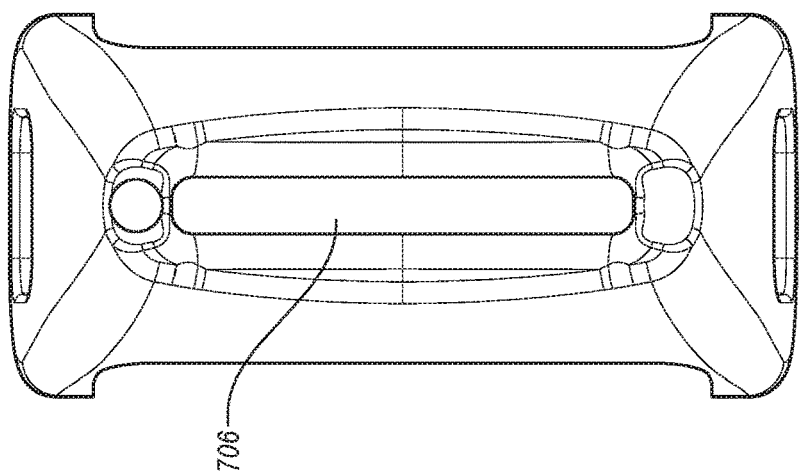
FIG. 9D illustrates an additional view of the pivot head of FIG. 9A.
Figure 9C:
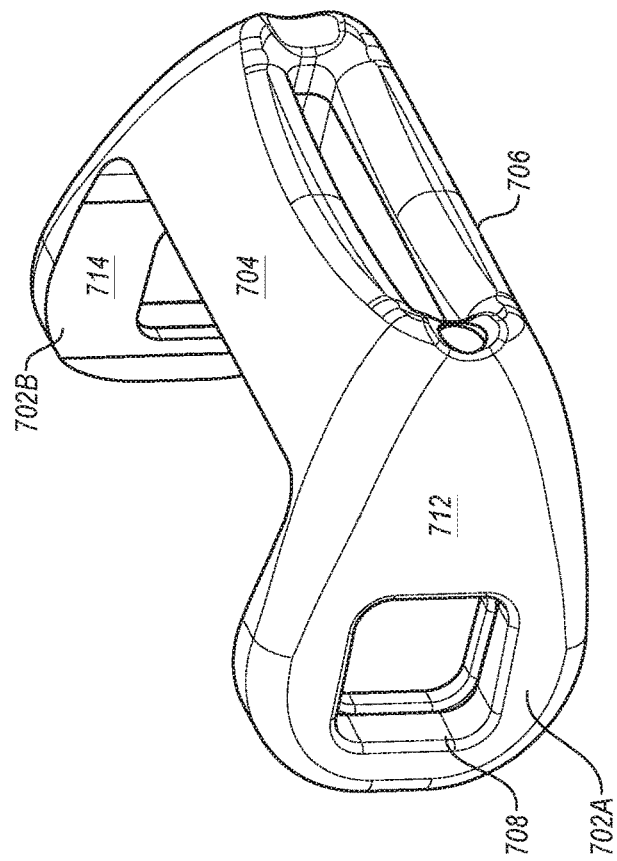
FIG. 9C illustrates an additional view of the pivot head of FIG. 9A.

FIGS. 9A-9D illustrate an example embodiment of the pivot head 700 that may be implemented in the second dental matrix device 200 of FIGS. 2 and 3. FIG. 9A depicts a side view of the pivot head 700. FIG. 9B depicts a top view of the pivot head 700. FIG. 9C is a perspective view of the pivot head 700. FIG. 9D depicts a front view of the pivot head 700.

With reference to FIG. 9B, the pivot head 700 may include two side portions 702A and 702B (generally, side portion 702 or side portions 702) that are connected by a central portion 704. In some embodiments, the side portions 702 may be connected to the central portion 704 at about right angles. For instance, the side portions 702 may be oriented at about 90 degrees relative to the central portion 704.

The side portions 702 may be angled towards one another as they meet the central portion 704. For example, as the side portions 702 meet the central portion 704, the side portions 702 may extend towards one another.

With reference to FIGS. 9C and 9D, the central portion 704 may narrow as the central portion 704 extends from the side portions 702. The central portion 704 may define a central hole 706. The central hole 706 may be elongated in a first direction defined between the side portions 702. The central hole 706 may include a width that is defined perpendicular to the first direction. The width may be smaller than the elongated dimension in the first direction.

The central hole 706 may be configured to receive a band. For example, the band may be looped around a tooth or positioned in the central hole 706. The shape of the central hole 706 may be configured to route two ends of the band next to one another such that the band forms a loop.

With reference to FIGS. 9A and 9C, the side portions 702 may each define an opening 708, which may be substantially similar to the opening 608 of FIGS. 6A-6D. As shown in FIG. 9C, the pivot head 700 may include a first side 712 and a second side 714. The rounded square cross section of the opening 708 may enable the winged pivot head 600 to be positioned in three orientations relative to the body 400. Some additional details of the orientations are described with reference to FIGS. 11A-11C.

Figure 10B:
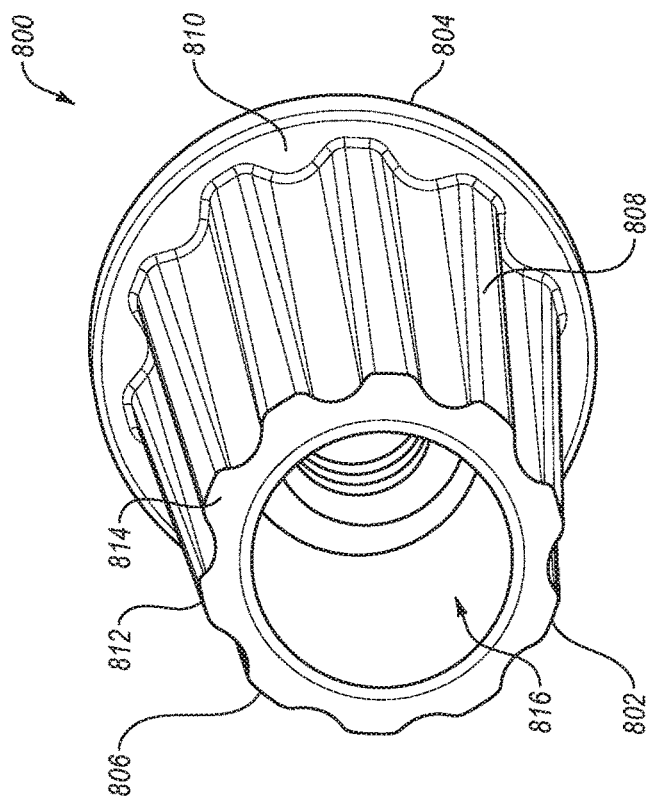
FIG. 10B illustrates an additional view of the knob of FIG. 10A.
Figure 10A:
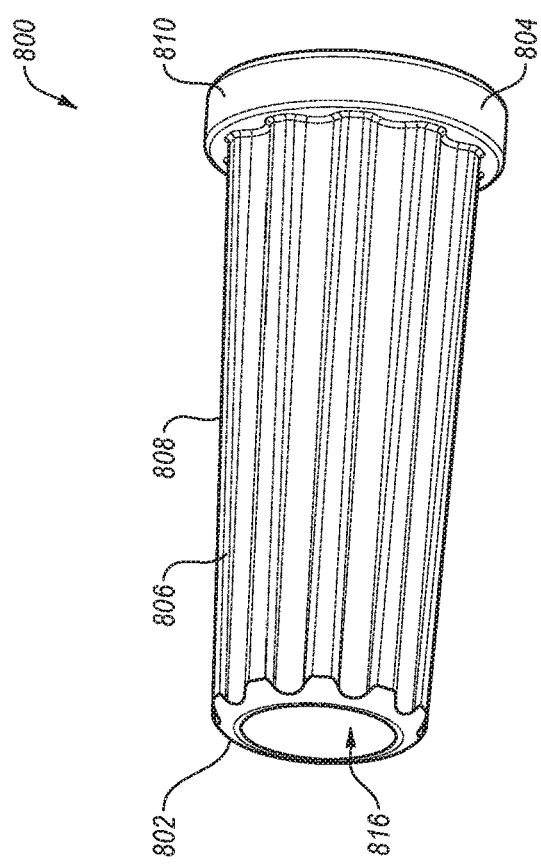
FIG. 10A illustrates an example knob that may be implemented in the first dental matrix device and the second dental matrix device of FIGS. 1 and 2.
Figure 10C:
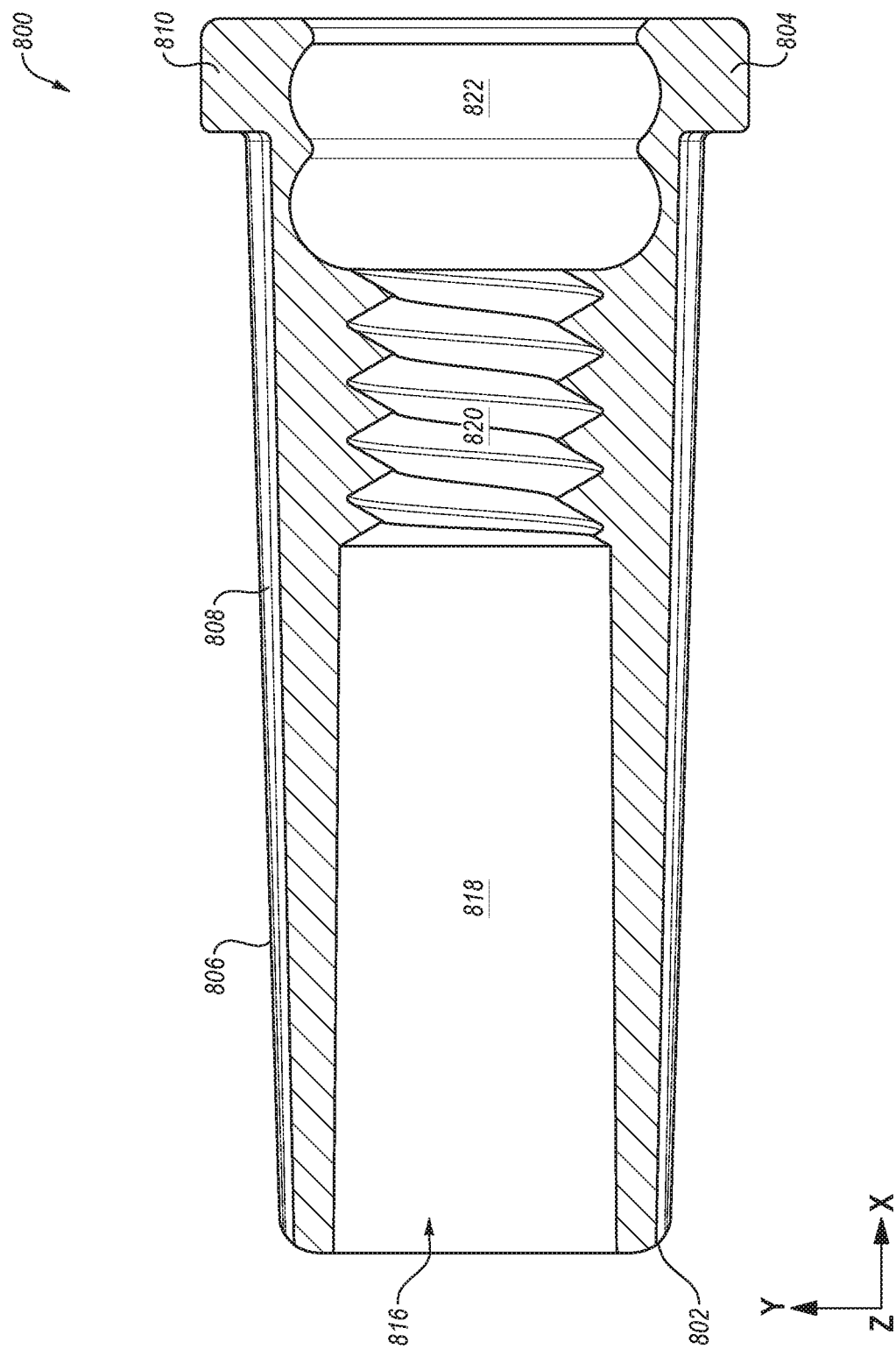
FIG. 10C illustrates an additional view of the knob of FIG. 10A.

FIGS. 10A-10C illustrate an example embodiment of the knob 800 that may be implemented by the matrix devices 100/200. FIG. 10A depicts a first perspective view of the knob 800. FIG. 10B depicts a rear perspective view of the knob 800. FIG. 10C depicts a sectional view of the knob 800.

The knob 800 includes a knob body 806 that is substantially cylindrical. The knob body 806 extends from a first end 802 to a second end 804. The knob body 806 includes external features defined in an external surface of the knob body 806. The external features may include longitudinal ridges 808 and a base ring 810. The base ring 810 is included at the second end 804. The base ring extends a portion of the length up the knob body 806. The longitudinal ridges 808 extend from the base ring 810 to the first end 802.

As best depicted in FIG. 10B, the longitudinal ridges 808 generally include raised structures that may be separated by lower portions. An outer edge and an outer surface of the longitudinal ridges 808 may be wave-shaped. For example, the outer edge and the outer surface of the longitudinal ridges 808 may have a sine wave-shaped pattern or another suitable wave-shaped pattern. In some embodiments, the longitudinal ridges 808 may have different widths at the top/outer-most portion. In FIG. 10B, two widths 812 and 814 are labelled. A first width 812 may be greater than a second width 814. The knob 800 may include multiple longitudinal ridges 808 having the first width 812 and multiple longitudinal ridges 808 having multiple longitudinal ridges 808 having the second width 814. In operation, a user may place their fingers against the longitudinal ridges 808. The user may then apply a rotational force that results in a rotation of the knob 800.

The knob body 806 may define a knob internal volume 816. The knob internal volume 816 may extend from the first end 802 to the second end 804. The knob internal volume 816 may include one or more sub-volumes. As best shown in FIG. 10C, the knob internal volume 816 may include an exit sub-volume 818, a threaded sub-volume 820, and an attachment sub-volume 822. The exit sub-volume 818 may be substantially cylindrical or may include one or more tapered portions. The exit sub-volume 818 may be open at the first end 802. A threaded portion of a clamp release such as the threaded portion 505 of the clamp retainer 500 may extend into the exit sub-volume 818. For example, as the clamp release translates in a body, a portion of the threaded portion may extend into the exit sub-volume 818.

The attachment sub-volume 822 may be configured to attach to a body such as the body 400. The attachment sub-volume 822 may extend from the second end 804 to the threaded sub-volume 820. The attachment sub-volume 822 may be shaped to create a snap-fit attachment with the body 400. For example, with reference to FIGS. 4A and 10C. The body 400 includes the attachment portion 401. The attachment portion 401 may be shaped to be retained in the attachment sub-volume 822. With the attachment portion 401 of the body 400 retained in the attachment sub-volume 822, the knob 800 may be retained relative to the body 400, which may prevent the knob 800 from being pulled from the body 400. Additionally, with the attachment portion 401 of the body 400 retained in the attachment sub-volume 822, the knob 800 may be capable of rotation relative to the body 400. Accordingly, the knob 800 may be retained relative to the body 400 and may rotate relative to the body 400.

Referring back to FIG. 10C, the threaded sub-volume 820 may extend from the attachment sub-volume 822 to the exit sub-volume 818. The threaded sub-volume 820 may have threads defined therein. The threads of the threaded sub-volume 820 may be shaped to interface with a threaded portion of a clamp release such as the threaded portion 505 of the clamp retainer 500. As the knob 800 rotates, the clamp release may translate relative to the knob 800. For example, when the knob 800 is rotated in a first direction, the clamp release may translate in the x-direction and when the knob 800 is rotated in a second direction, the clamp release may translate in the negative x-direction.

Figure 11A:
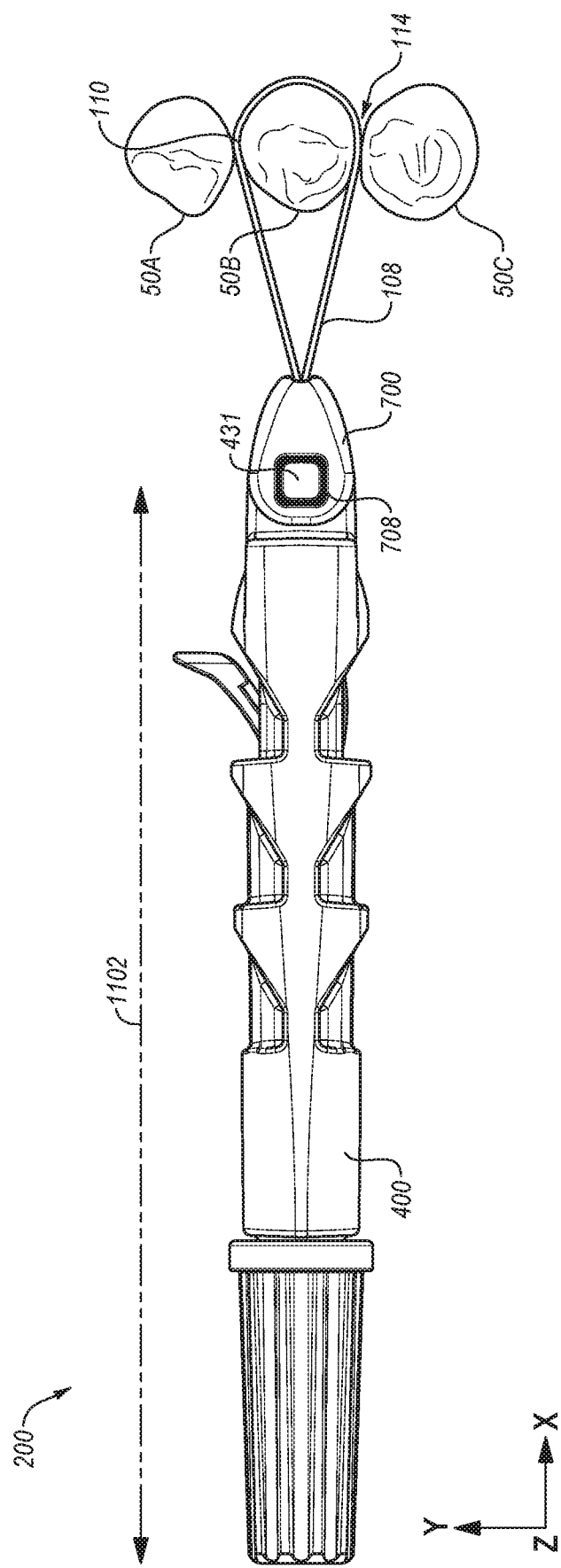
FIGS. 11A-11C illustrate the second dental matrix device in multiple configurations interfaced with a tooth.
Figure 11B:
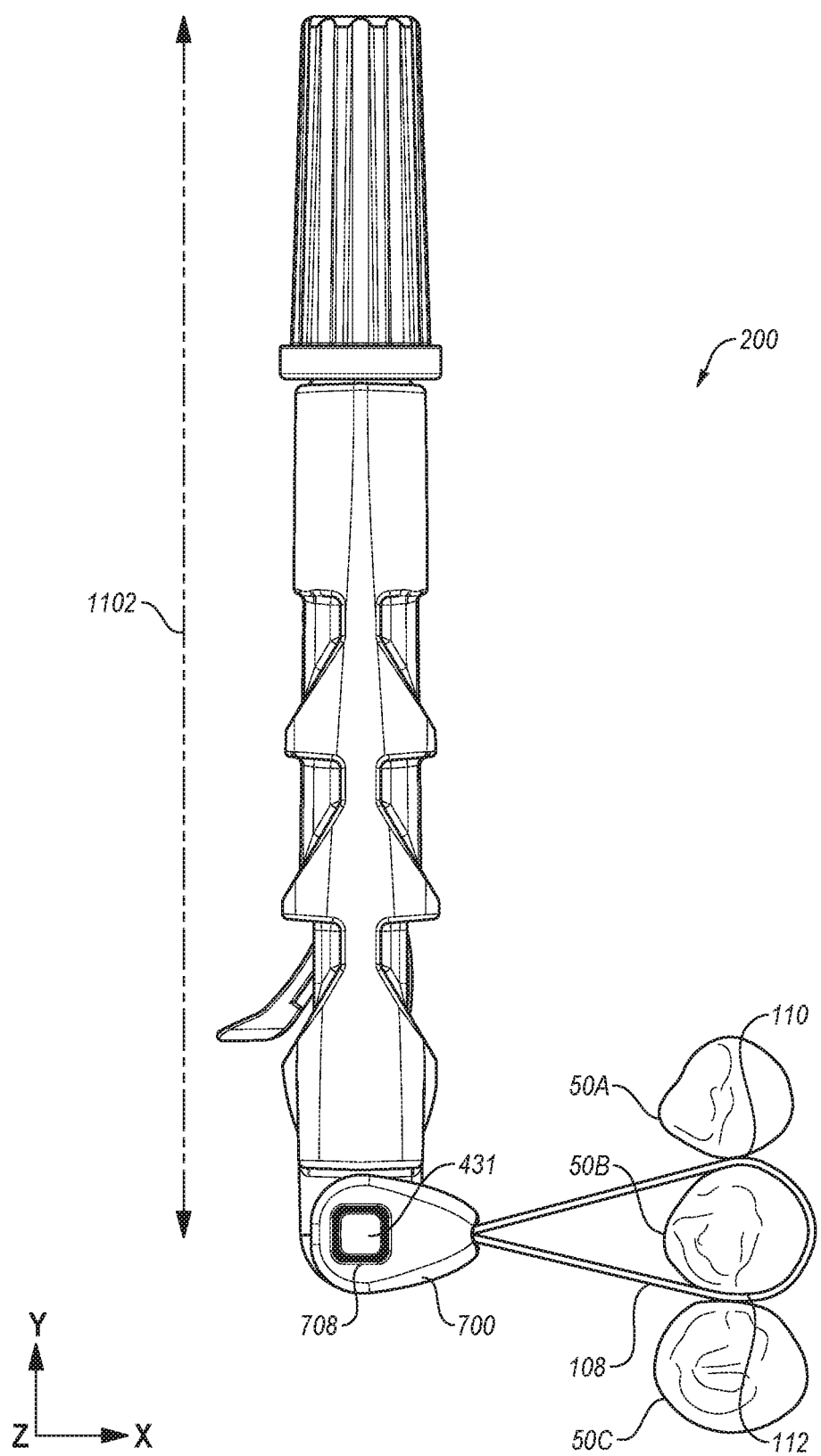
Figure 11C:
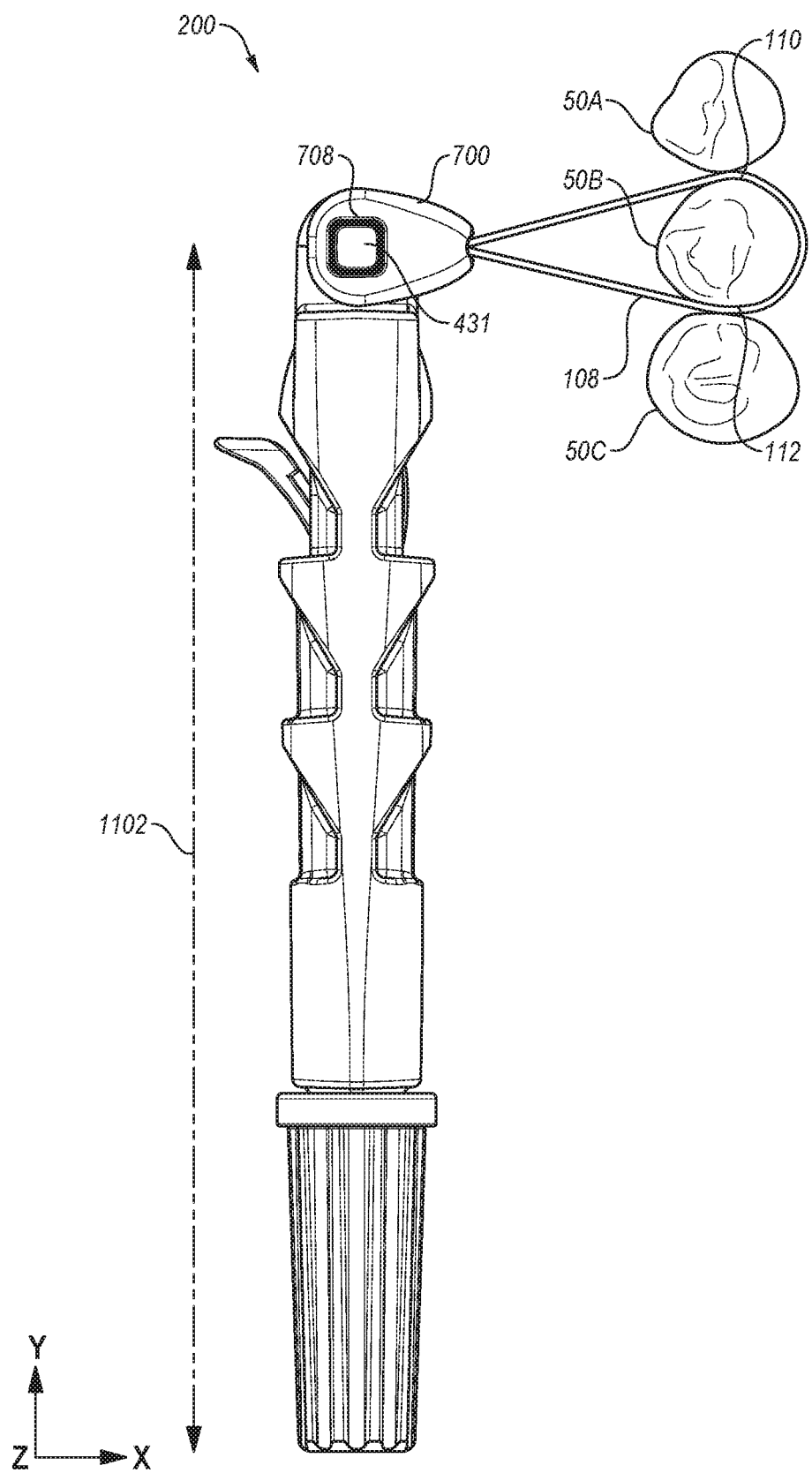

FIGS. 11A-11C illustrate the second dental matrix device 200 in multiple configurations. In FIG. 11A, the second dental matrix device 200 is depicted in an in-line configuration. In the in-line configuration, the band 108 is extended in substantially the same direction as a longitudinal dimension 1102 of the body 400.

In the in-line configuration of FIG. 11A, the pivot retainer 431 may be positioned in the opening 708. When positioned in the in-line configuration, the substantially square pivot retainer 431 may contact each side of the opening 708. That is the substantially square pivot retainer 431 may fit within the opening 708 which is also substantially square.

In FIG. 11B, the second dental matrix device 200 is depicted in a first angled configuration. In the first angled configuration, the band 108 is angled relative to the longitudinal dimension 1102 of the body 400. In the first angled configuration of FIG. 11B, the pivot retainer 431 may be positioned in the opening 708. When positioned in the first angled configuration, the substantially square pivot retainer 431 may contact each side of the opening 708. Additionally, the substantially square pivot retainer 431 may fit within the opening 708 which is also substantially square.

In FIG. 11C, the second dental matrix device 200 is depicted in a second angled configuration. In the second angled configuration, the band 108 is angled relative to the longitudinal dimension 1102 of the body 400. In the second angled configuration of FIG. 11B, the pivot retainer 431 may be positioned in the opening 708. When positioned in the second angled configuration, the substantially square pivot retainer 431 may contact each side of the opening 708. Additionally, the substantially square pivot retainer 431 may fit within the opening 708 which is also substantially square.

In the embodiments of FIGS. 11A-11C, there are three configurations. In other embodiments, there may be more than three configurations. In these and other embodiments, the opening 708 and the pivot retainer 431 may include a cross-sectional shape other than a square. For instance, in embodiments having five configurations, the opening 708 and the pivot retainer 431 may include a hexagon cross-section. Additionally, FIGS. 11A-11C depict the second dental matrix device 200. The first dental matrix device 100 may also be configurable in the three configurations of FIGS. 11A-11C.

Figure 12:
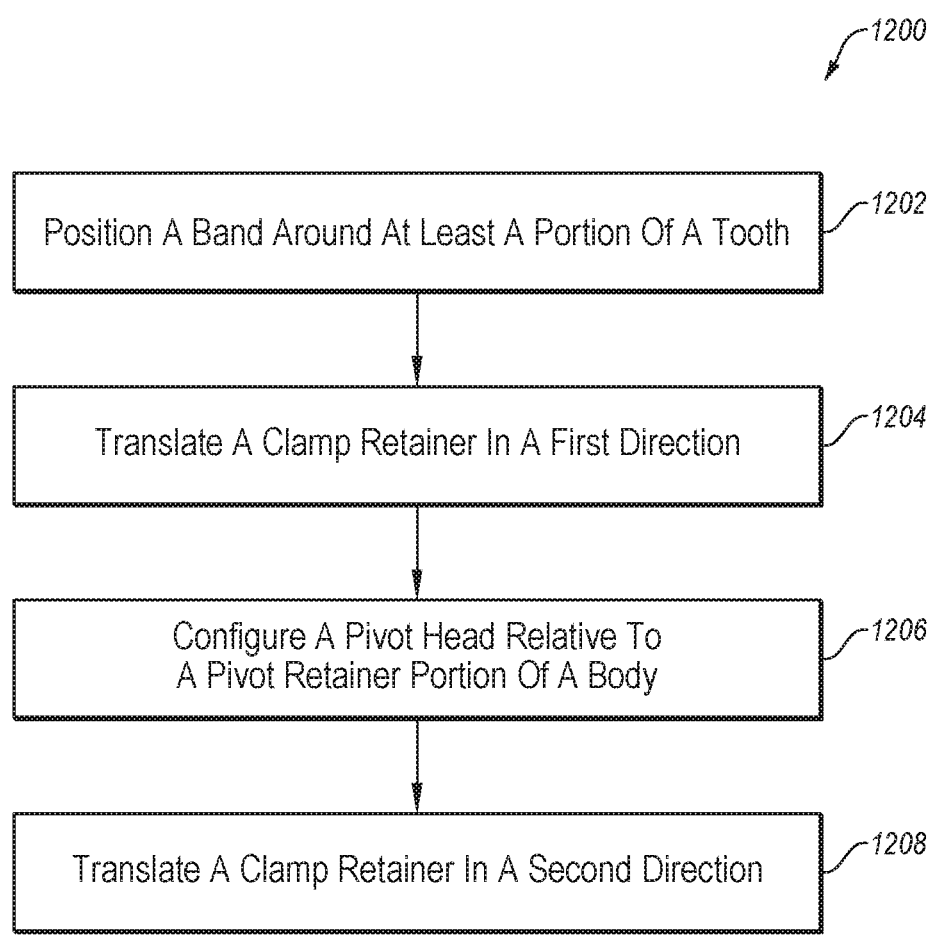
FIG. 12 is a flow chart of an example method of isolation of at least a portion of an outer surface of a tooth.

FIG. 12 is a flow chart of an example method 1200 of isolation of at least a portion (e.g., an outer surface) of a tooth according to at least one embodiment of the present disclosure. The method 1200 may be implemented during a dental restorative procedure in some embodiments. The method 1200 may be performed using one or more of the dental matrix devices (e.g., 100 and 200) described in the present disclosure. Although illustrated as discrete blocks, various blocks in FIG. 12 may be divided into additional blocks, combined into fewer blocks, or eliminated, depending on the desired implementation.

The method 1200 may begin at block 1202 in which a band may be positioned around at least a portion of a tooth. The band may be positioned around a tooth such that an inner side surface of the band is adjacent to at least a portion of an outer surface of the tooth. At block 1204, a clamp retainer may be translated in a first direction. The translating a clamp retainer in the first direction may draw the band into a clamp cavity which may be defined at least partially by a body of a dental matrix device. In some embodiments, the clamp retainer may include a clamp portion having a levered portion that retains the band relative to the body and the clamp retainer may include a threaded portion. The translation of the clamp retainer in the first direction may reduce a length of a portion of the band that extends from the body. Additionally, in some embodiments, the translating the clamp retainer in the first direction may include rotating a knob in a first rotational direction. The knob may be interfaced with the threaded portion and may be attached to an attachment portion of the body.

At block 1206, a pivot head may be configured relative to a pivot retainer portion of the body. The pivot retainer portion may include a pivot retainer that is substantially square. The configuring the pivot head may include positioning the pivot head in one or more orientations such as in a first orientation relative to the body, in a second orientation relative to the body, and in a third orientation relative to the body. In the first orientation the band may be at a first substantially right angle relative to the body. In the second orientation, the band may be substantially aligned with the body. In the third orientation, the band may be at a second substantially right angle relative to the body.

At block 1208, the clamp retainer may be translated in a second direction. The clamp retainer may be translated in a second direction following a dental restorative procedure. The translating the clamp retainer in the second direction may include pushing the levered portion up a ramp of the body. Pushing the levered portion up the ramp may separate the levered portion from a base of the clamp portion, which may release the band from the clamp portion. The levered portion may protrude from the clamp cavity through a window, which may be positioned near or immediately adjacent to the ramp. The translating the clamp retainer in the second direction may include rotating the knob in a second rotational direction. In some circumstances, the method 1200 or portions thereof may be performed multiple times with multiple dental matrix devices.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

One of ordinary skill in the art will appreciate after reviewing this disclosure that the matrix devices may have other suitable shapes, sizes, configurations, and arrangements depending, for example, upon the intended use. One of ordinary skill in the art will also appreciate that different components of the matrix devices may have various shapes, sizes, configurations, and arrangements depending, for example, upon the intended use of the matrix devices. Further, one of ordinary skill in the art will appreciate the matrix devices may include any suitable number or combination of features or aspects.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A dental matrix device comprising:
   a band that is configured to be positioned around a tooth;
   a body including a clamp cavity extending therethrough, an aperture extending through an outer wall of the body, the aperture spaced apart from both ends of the body, and a ramp disposed in the outer wall of the body and sloping toward the aperture;
   a knob configured to be rotatably secured relative to one end of the body; and
   a clamp retainer, for clamping the band, at least partially positioned in the clamp cavity, the clamp retainer including:
   a threaded portion that interfaces with the knob such that rotation of the knob translates the clamp retainer in the clamp cavity; and
   a clamp portion that includes a levered portion and a base, the clamp portion being configurable in a first arrangement in which the levered portion and the base are positioned in the body and in a second arrangement in which at least a portion of the levered portion extends through the aperture and the base does not extend through the aperture.

2. The dental matrix device of claim 1, wherein:
   translation of the clamp retainer in a first direction draws the clamp retainer into the clamp cavity and reduces a length of a portion of the band that extends from the body; and
   translation of the clamp retainer in a second direction pushes the levered portion up the ramp to transfer the clamp retainer from the first arrangement to the second arrangement to release the band from the clamp portion.

3. The dental matrix device of claim 1, wherein:
   the clamp retainer further includes a hinge; and
   the hinge includes a strip of material that enables the levered portion to rotate relative to the base such that a lower surface of the levered portion contacts or is positioned immediately adjacent to an upper surface of the base when the clamp retainer is configured in the first arrangement.

4. The dental matrix device of claim 3, wherein the clamp retainer further includes a spring that extends from the base on a surface opposite the upper surface, the spring being configured to press against an inner surface of the clamp cavity to force the base towards the levered portion.

5. The dental matrix device of claim 3, wherein:
   the band defines an opening at each end;
   the clamp retainer includes a tab that extends from the upper surface of the base;
   the levered portion defines a tab slot that is configured to receive the tab;
   in the first arrangement, the tab is positioned in the openings of the band and in the tab slot of the levered portion; and
   in the second arrangement, the tab is withdrawn from the tab slot.

6. The dental matrix device of claim 5, wherein the tab slot includes a semi-cylindrical portion and a rectangular portion that extends out a side of the levered portion.

7. The dental matrix device of claim 3, wherein:
   the aperture is defined on a surface of an indentation of the body;
   the ramp includes a surface of the indentation and slopes towards the aperture;
   the levered portion extends from the clamp cavity onto the ramp; and
   as the levered portion is pressed up the ramp, the levered portion is moved away from the base.

8. The dental matrix device of claim 1, further comprising a pivot head, wherein:
   the body includes a pivot retainer portion that is configured to be attached to the pivot head; and
   the band exits the body at a first end and extends from the body through the pivot head.

9. The dental matrix device of claim 8, wherein:
   the pivot retainer portion includes a pivot retainer that is substantially square; and
   the pivot head is configurable in three orientations relative to the body.

10. The dental matrix device of claim 8, wherein the pivot head includes:
    a central portion;
    two side portions that are connected by the central portion at about right angles and angled towards one another as the two side portions meet the central portion; and
    the central portion narrows as the central portion extends from the side portions.

11. The dental matrix device of claim 10, wherein the pivot head includes a winged pivot head.

12. The dental matrix device of claim 10, wherein:
    the central portion defines a central hole which includes an elongated dimension in a first direction defined between the two side portions;
    the central hole is configured to receive two ends of the band next to one another such that the band forms a loop;

the central hole includes a width that is defined perpendicular to the first direction; and
the width is smaller than the elongated dimension of the central hole.

13. A dental matrix device, comprising:
a body including a clamp cavity, an aperture extending through an outer wall of the body, the aperture spaced apart from both ends of the body, and a ramp disposed in the outer wall of the body and immediately adjacent to the aperture, the ramp spaced apart from both of the ends of the body; and
a clamp retainer, for clamping a dental matrix band, at least partially positioned in the clamp cavity, the clamp retainer including a clamp portion at a first end that includes a levered portion that is rotatably connected to a base, wherein:
translation of the clamp retainer in a first direction draws the clamp retainer into the clamp cavity such that a lower surface of the levered portion rotates towards an upper surface of the base; and
translation of the clamp retainer in a second direction pushes the levered portion up the ramp to separate the lower surface of the levered portion from the upper surface of the base.

14. The dental matrix device of claim 13, wherein:
the clamp retainer further includes a spring that extends from the base on a surface opposite the upper surface; and
the spring is configured to press against an inner surface of the clamp cavity to force the base towards the levered portion.

15. The dental matrix device of claim 13, further comprising a band that is configured to be positioned around a tooth, wherein:
the band defines an opening at each end;
the clamp retainer includes a tab that extends from the upper surface of the base;
the levered portion defines a tab slot that is configured to receive the tab; and
the tab is positioned in the openings of the band and in the tab slot of the levered portion.

16. The dental matrix device of claim 15, wherein:
the translation of the clamp retainer in the first direction reduces a length of a portion of the band that extends from the body; and
the translation of the clamp retainer in the second direction withdraws the tab from the tab slot and enables release of the band from the clamp portion.

17. The dental matrix device of claim 15, wherein the tab slot includes a semi-cylindrical portion and a rectangular portion that extends out a side of the levered portion.

18. The dental matrix device of claim 15, further comprising:
a pivot head that is rotatably attached to a pivot retainer portion of the body; and
the band exits the body at a first end and extends from the body through the pivot head,
wherein:
the pivot retainer portion includes a pivot retainer that is substantially square; and
the pivot head is configurable in a first orientation relative to the body in which the band is at a first substantially right angle relative to the body, in a second orientation relative to the body in which the band is substantially aligned with the body, and in a third orientation relative to the body in which the band is at a second substantially right angle relative to the body.

19. The dental matrix device of claim 18, wherein the pivot head includes:
two side portions; and
a central portion that connects the two side portions and defines a central hole that is elongated in a first direction between the side portions,
wherein:
the central portion narrows as the central portion extends from the side portions; and
the two side portions are angled towards one another.

20. The dental matrix device of claim 19, wherein the pivot head includes a winged pivot head.

21. The dental matrix device of claim 13, further comprising a knob, wherein:
the body includes an attachment portion;
the knob configured to be attached to the attachment portion such that the knob is secured relative to the body and rotates relative to the body; and
the clamp retainer includes a threaded portion that interfaces with the knob such that rotation of the knob in a first rotational direction translates the clamp retainer in the clamp cavity in the first direction and rotation of the knob in a second rotational direction translates the clamp retainer in the clamp cavity in the second direction.

* * * * *